329,205 (ceramic)

United States Patent [19]

Chigasaki

[11] Patent Number: 5,008,766
[45] Date of Patent: Apr. 16, 1991

[54] TAPE CASSETTE ATTACHMENT DEVICE WITH CLOSURE PLATE ACTUATED INSERTION SENSOR

[75] Inventor: Hiroyuki Chigasaki, Tokyo, Japan

[73] Assignee: Sony Corporation, Tokyo, Japan

[21] Appl. No.: 372,451

[22] Filed: Jun. 28, 1989

[30] Foreign Application Priority Data

Jun. 28, 1988 [JP] Japan .................................. 63-160286

[51] Int. Cl.⁵ ............................................ G11B 15/675
[52] U.S. Cl. .................................................. 360/96.5
[58] Field of Search ...................... 360/96.5, 85, 84, 71

[56] References Cited

U.S. PATENT DOCUMENTS 4,799,117 1/1989 Ohyama ............................. 360/96.5

Primary Examiner—Robert S. Tupper
Attorney, Agent, or Firm—Hill, Van Santen, Steadman & Simpson

[57] ABSTRACT

This invention is relative with a tape cassette attachment device applied to a magnetic recording/reproducing apparatus, such as a cassette tape recorder, wherein a cassette holder into which is inserted and held a tape cassette having a closure plate mounted to the bottom surface of the cassette half for movement between the position of closing the reel drive shaft insertion openings formed in the bottom surface of the cassette half rotatably accommodating a pair of tape reels carrying a magnetic tape and the position of opening the reel drive shaft insertion openings is shifted horizontally and vertically for attaching the tape cassette at a predetermined tape cassette attachment position in the main body of the apparatus. The tape cassette enables the shifting operation of the cassette holder to effect tape cassette attachment only when the tape cassette is correctly inserted and held with respect to the cassette holder.

3 Claims, 15 Drawing Sheets

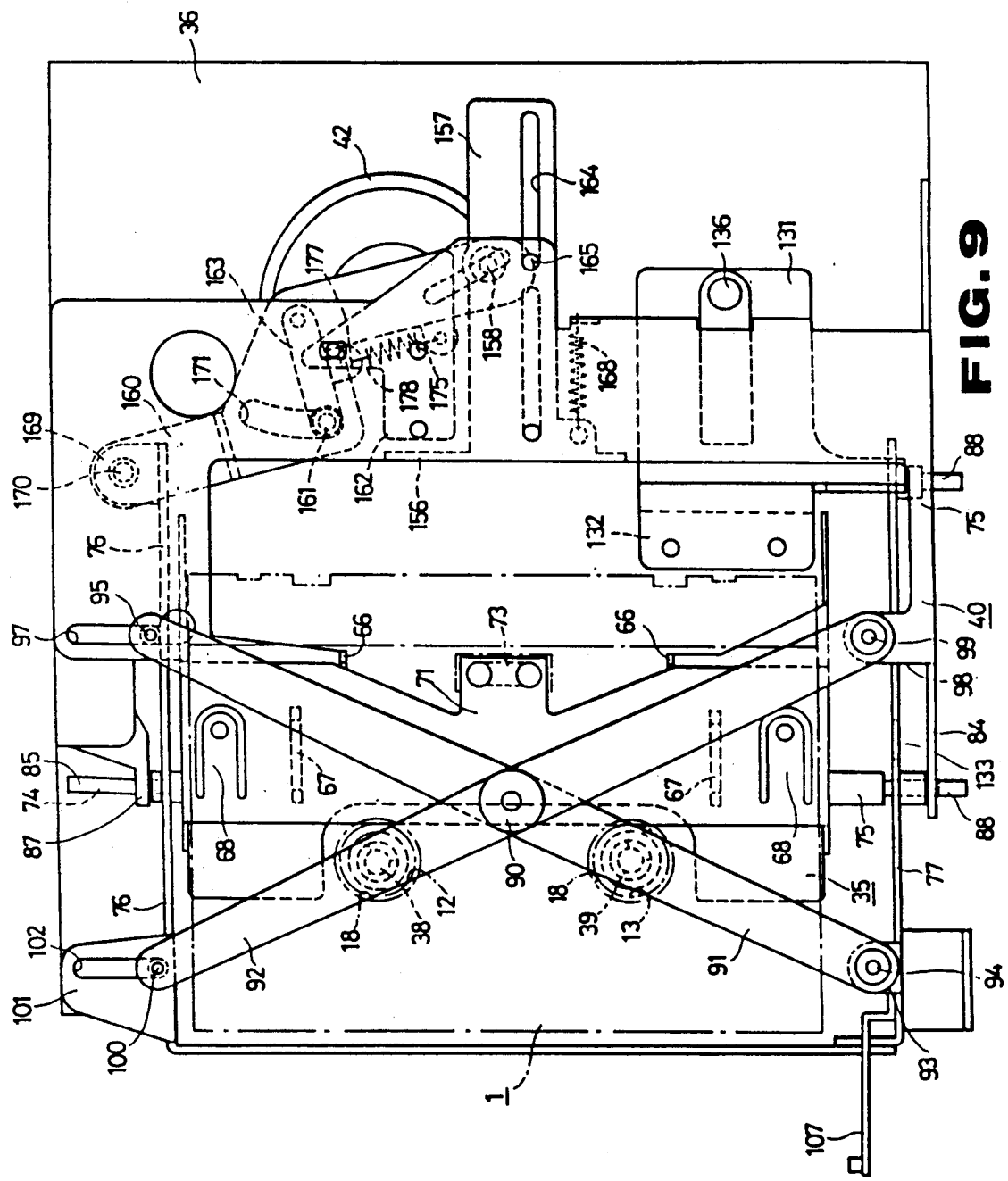

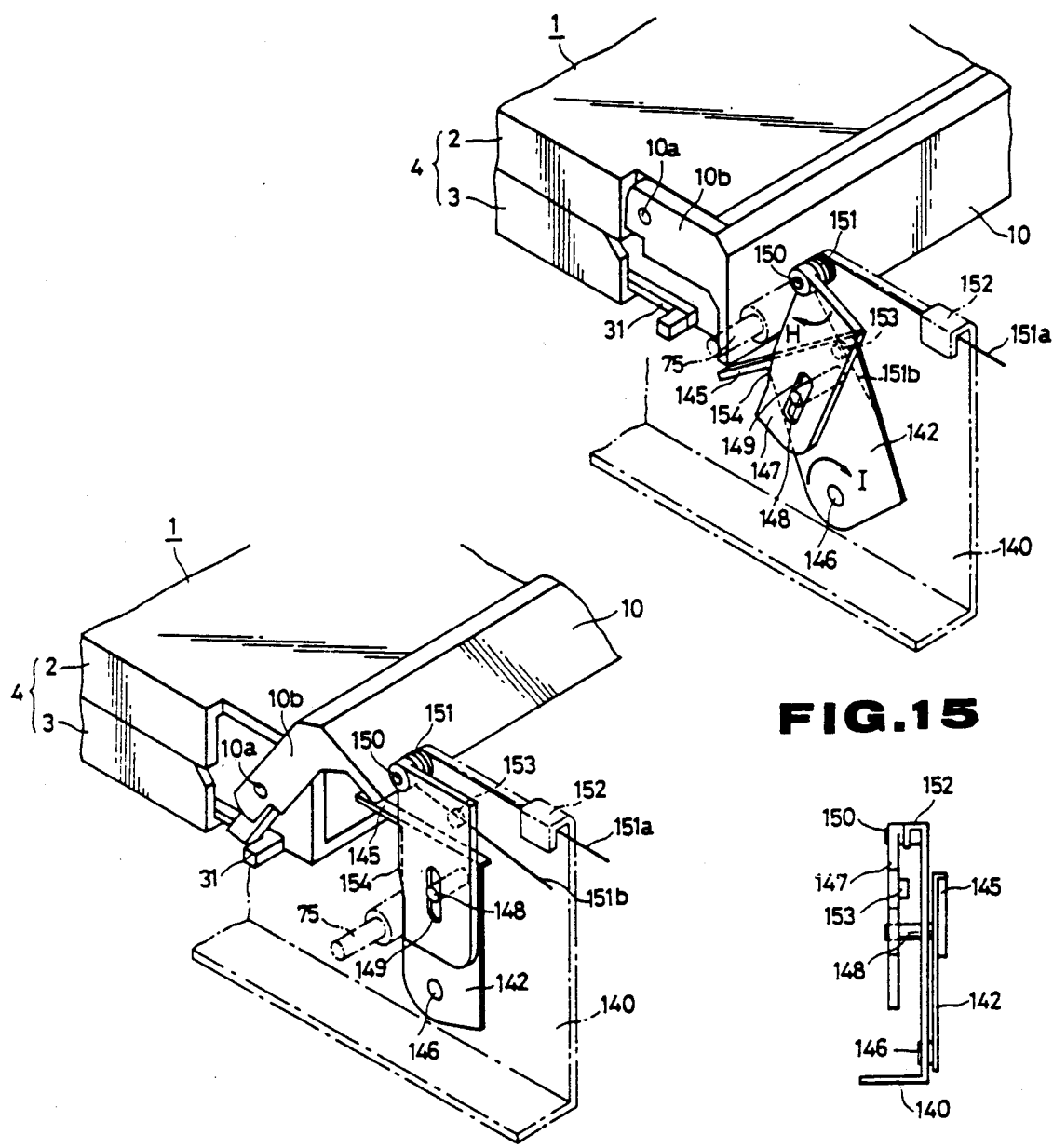

TAPE CASSETTE ATTACHMENT DEVICE WITH CLOSURE PLATE ACTUATED INSERTION SENSOR

BACKGROUND OF THE INVENTION AND RELATED ART STATEMENT

This invention relates to a tape cassette attachment device applied to a magnetic recording/reproducing apparatus, such as a cassette type tape recorder, wherein a cassette holder into which the tape cassette is inserted and held is shifted both horizontally and vertically for attaching the tape cassette at a predetermined tape cassette attachment position in the main body of the apparatus. More particularly, it relates to such tape cassette attachment device wherein the tape cassette is provided on the bottom side of the cassette half with a closure plate for closing reel drive shaft insertion openings and wherein the closure plate is shifted by the tape cassette inserting operation to open the reel drive shaft insertion openings.

Conventionally, a digital audio tape recorder (DAT), making use of a rotary magnetic head device, is employed as the cassette type tape recorder. For protecting the magnetic tape therein as the recording medium, the tape cassette used in this tape recorder DAT has the structure of completely sealing the magnetic tape during non-use when the tape cassette is not attached to the tape recorder. That is, the front side or the tape extracting side of the tape cassette is covered by a front cover that may be turned to open or close the front side, while its bottom side is covered by a closure plate that may be slid to open or close the reel drive shaft insertion openings.

In the above described magnetic recording/reproducing apparatus, such as the digital audio tape recorder, employing the tape cassette provided at least with a closure plate, in order for the tape cassette to be attached at a predetermined tape attachment position fitted with the reel drive shafts, it is necessary to shift the closure plate previously to its opening position to open the reel drive shaft inserting opening before the tape cassette is attached in the tape cassette attachment position.

The digital audio tape recorder employing the tape cassette provided with the closure plate as the recording medium is provided with a tape cassette attachment device whereby the tape cassette is attached to the predetermined tape cassette attachment position as the closure plate is shifted to open the reel drive shaft insertion openings. As this type of the tape cassette attachment device, the present Applicant has proposed the device such as disclosed in the Japanese Unexamined Patent Publication No. 283060/1986 or the Japanese Unexamined Utility Model Publication No. 147156/1987. In the tape cassette attachment device shown in these Publications, the cassette holder in which the tape cassette is inserted and held is provided with means for opening or closing the closure plate, which is shifted to its opening position as the cassette holder is fed towards the main body of the apparatus to open the reel drive shaft insertion openings. The closure plate is alternatively shifted in operative association with the operation of inserting and retaining the tape cassette in the cassette shifted to open the reel drive shaft insertion opening. Meanwhile, in the tape cassette attachment device for attachment of the above described tape cassette provided with the closure plate, it is necessary that, after the closure plate is shifted to open the reel drive shaft insertion opening and the tape reel in the tape cassette is enabled to engage with the reel drive shafts of the recording/reproducing apparatus, the cassette holder holding the tape cassette be shifted towards the tape cassette attachment position.

OBJECT AND SUMMARY OF THE INVENTION

It is therefore an object of the present invention to provide a tape cassette attachment device wherein the tape cassette provided with the closure plate is shifted horizontally and vertically for accurately inserting and holding the tape cassette at a prescribed position within the cassette holder.

It is another object of the present invention to provide a tape cassette attachment device wherein the shifting of the cassette holder is enabled only when the closure plate is shifted to open the reel drive shaft insertion openings to provide for a safe and positive tape cassette attachment operation.

It is a further object of the present invention to provide a tape cassette attachment device wherein protection of the mechanical portions of the apparatus and the tape cassette may be achieved.

It is still another object of the present invention to provide a tape cassette attachment device wherein the insertion of the tape cassette into the cassette holder may be detected by a simplified structure.

For accomplishing the above objects, the present invention provides a tape cassette attachment device comprising, a cassette holder into which a tape cassette rotatably accommodating a pair of tape reels carrying a magnetic tape wound thereon, a slide guide frame supporting said cassette holder for vertical movement and supported for reciprocation with respect to a chassis of a main body, said slide guide frame being reciprocated between a first position in which, said tape cassette is enabled to be inserted into or detached from said cassette holder and a second position in which the tape reels of said tape cassette are in register with reel drive shafts on said chassis, and vertically shifting said cassette holder at said second position, locking and holding means for locking and holding said slide guide frame at said first position with respect to said chassis for inhibiting the shifting of said slide guide frame, and means for sensing the tape insertion, said means sensing that said tape cassette has been inserted to said prescribed position in said cassette holder and releasing locking of said locking and holding means.

The above and other objects, features and advantages will become more apparent from the following description especially when read in conjunction with the accompanying drawings.

BRIEF DESCRIPTION OF THE DRAWINGS

FIG. 9 is a plan view showing the state in which a slide guide frame is moved to its innermost lateral position.

FIGS. 15 to 17 illustrate a unit for opening a front lid for the tape cassette, wherein FIG. 15 is a perspective view showing the state before the operation, FIG. 16 is a back side view thereof and FIG. 17 is a perspective view showing the state of closure of the front lid.

FIGS. 20 to 23 illustrate the tape cassette employed in a digital audio tape recorder, wherein FIG. 20 is a perspective view looking from the upper side thereof when the tape cassette is not in use, FIG. 21 is a perspective view from the lower side thereof when the tape cassette is not in use, FIG. 22 is a perspective view showing the state in which the front lid is opened and FIG. 23 is a bottom side view showing a closure plate closing a reel drive shaft inserting opening.

DESCRIPTION OF PREFERRED EMBODIMENTS

The present invention will be explained hereinbelow with reference to an example in which the present invention is applied to a digital audio tape recorder provided with a rotary magnetic head device.

In connection with the description of an embodiment of the digital audio tape recorder to which the present invention is applied.

For satisfactory protection of a magnetic tape accommodated within a cassette half, the tape cassette completely sealed when it is out of use, such as during the storage period when it is not attached to the tape recorder.

Figure 20:
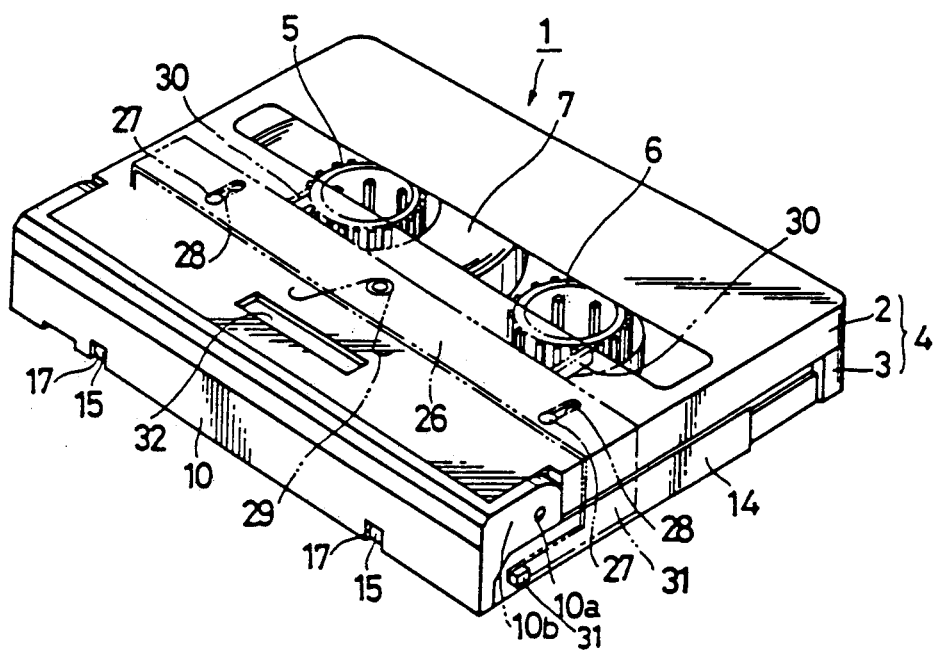
Figure 21:
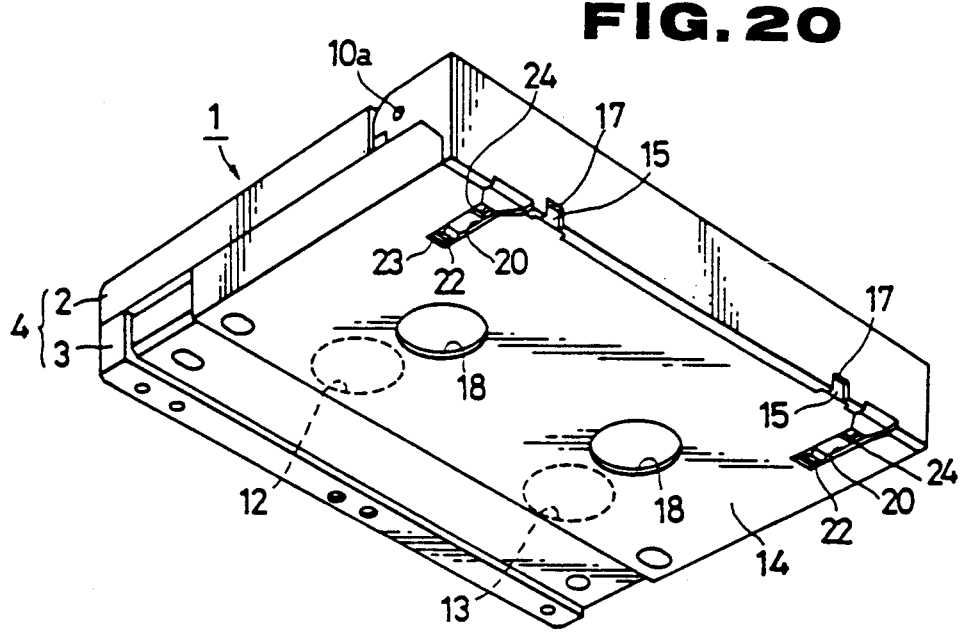
Figure 22:
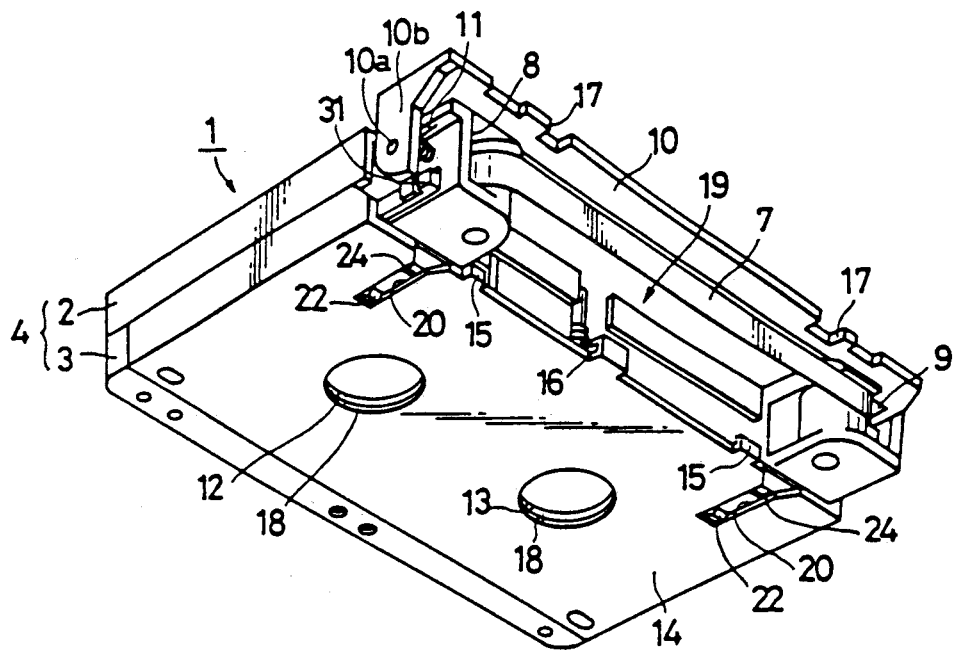

Thus, as shown in FIGS. 20 to 23, the tape cassette 1 includes a cassette half 4 formed by an upper half 2 and a lower half 3 abutted and secured to each other. A pair of tape reels 5 and 6 are rotatably supported within the cassette half 4 and a magnetic tape 7 is wound on these tape reels 5 and 6. The magnetic tape 7 is extended outwardly on the front side of the cassette half 4 via tape extraction openings 8 and 9 formed on both forward sides of the cassette half 4, so as to be wound from the one tape reel 5 to the other tape reel 6. On the front side of the cassette 4, a front lid 10 is rotatably mounted for protecting the magnetic tape 7 extended on the front side of the cassette half 4 at the time of non-attachment of the tape cassette 1 to the, tape recorder. As shown in FIG. 22, this front lid 10 is rotationally biased in a direction of covering the magnetic tape 7 extended on the front side of the cassette half 4.

Figure 23:
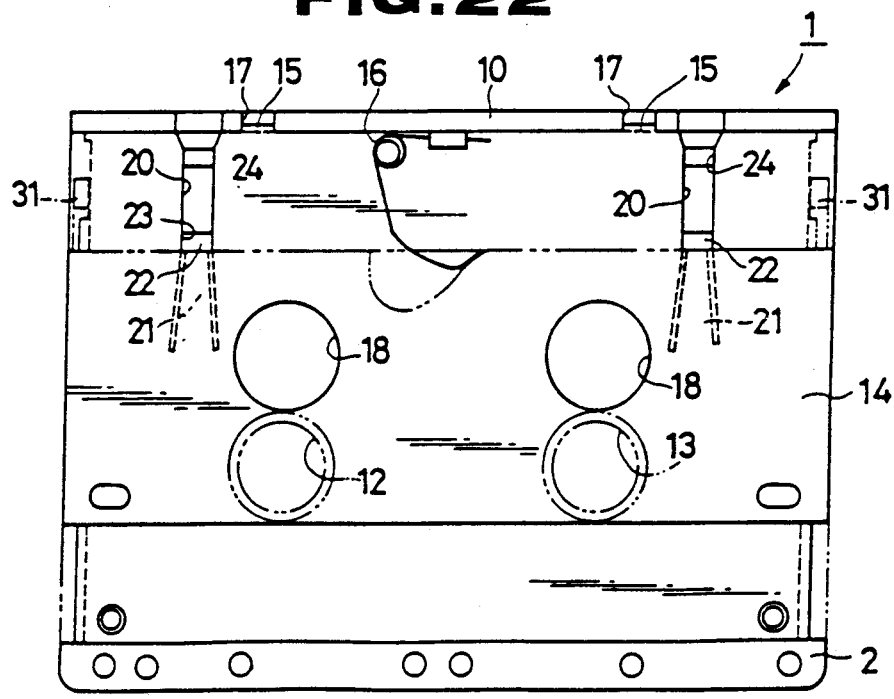

Referring to FIGS. 21 to 23, a closure plate 14 having a U-shaped cross-section is provided on the bottom side of the cassette half 4 for sliding back and forth for closing the reel drive shaft insertion openings 12 and 13 formed on the bottom surface of the cassette half 4 to prevent intrusion of dust and dirt into the cassette half 4 to protect the magnetic tape 7. The formed edge of this closure plate 14 is formed with a pair of lugs 15, 15 which, when an urging action is imparted from a torsion spring 16 mounted to the cassette half 4 for causing the movement towards the front side of the cassette half 4 in a direction of closing the reel drive shaft inserting openings 12 and 13, are engaged with the front side of the cassette half 4, as shown in FIG. 23, for regulating the shift position of the closure plate 14. The lower edge of the front lid 10 corresponding to the lugs 15, 15 are formed with recesses 17, 17 acting as a clearance when the cassette half 4 is shifted relative to the closure plate 14.

The planar surface of the closure plate 14 is formed with a pair of insertion openings 18, 18 which may be in register with the reel shaft insertion openings 12, 13 formed in the bottom plate of the lower half 3, as shown by ,double dotted chain line in FIG. 23, when the closure plate 14 performs a relative movement towards the rear side of the cassette half 4, so that the reel driving shafts provided to the tape recorder may be introduced into the cassette half 4 via the reel drive shaft insertion openings 12 and 13 provided to the tape recorder so as to be engaged with a pair of tape reels. When the closure plate 14 is shifted forwardly to close the lower side of a spacing 19 confronted by a tape extraction unit of a loading mechanism provided to the tape recorder for extracting the magnetic tape 7 situated on the front side of the cassette half 4 outwardly of the cassette half 4 by way of tape loading, as shown in FIG. 21, the insertion openings 18, 18 of the closure plate 14 and the reel drive shaft insertion openings 12, 13 are out of register with each other so that these openings 12, 13 are closed by the planar surface of the closure plate 14.

The closure plate 14 is provided with recesses or grooves 20 into which fit ribs, not shown, provided on the bottom plate of the cassette holder provided in turn to the tape recorder, as later described. These ribs act as means for disengaging an engaging unit of the closure plate 14. These grooves 20 are formed for opening at the forward edge of the closure plate 14 and for extending some distance in the fore and aft direction, that is, the shifting direction of the closure plate 14. In each of these recesses 20, there are formed an engaging opening 23 and an engaging recess 24 into which is engaged a retaining projection 22 of a locking member 21 provided to the cassette half 4 for retaining the closure plate 14 not only at the closure position of closing the spacing 19 of the cassette half 4 and the reel drive shaft insertion openings 12, 13 by the closure plate 14 but also at the opening position of the spacing 19 and the insertion openings 12, 13. The bottom plate of the lower half 3 is formed with a U-shaped groove so that the locking member 21 has an integral hemispherical engaging projection on the lower side of the forward end, with the rear end being connected to the bottom plate of the lower half 3.

When the closure plate 14 is closed as shown in FIGS. 21 and 23, the retaining projection 22 at the forward side of the locking member 21 is engaged in the engaging opening 23 formed in the closure plate 14 for retaining the closure plate 14 against movement towards the opening position Within the cassette half 4, a reel lock lever 26, designed to prevent inadvertent rotation of the tape reels 5, 6 during non-attachment to the tape recorder and the consequent loosening and injury of the magnetic tape 7 placed on the reels, is provided for extending in the widthwise direction on the inner lateral side of the upper half 2, as shown in FIG. 20. The reel lock lever 26 is supported for sliding back and forth with respect to the tape reels 5 and 6, with a pair of slide guide pins on the inner lateral side of the upper half 2 engaging in elongated apertures 28, 28, and is urged by a torsion coil spring 29 provided to the inner lateral side of the upper half 2 in the direction of the tape reels 5 and 6. These tape reels 5 and 6 are locked against rotation by that thrust members 30, 30 formed on one side of the reel lock lever 26 are pressured onto the outer periphery of the upper ends of the tape reels 5 and 6. A pair of shifting arms 31 engaged with rotary members 10b of the front lid 10 at the time of the opening operation of the lid 10 are formed on both sides of the reel lock lever 26 for extending back and forth on the lateral side of the cassette half 4. When the front lid 10 is operated for opening the front side of the cassette half 4, as shown in FIG. 22, the shift arm 31 is moved forwardly of the cassette half 4 by the rotary members of the front lid 10, the reel lock lever 26 being shifted in a direction away from the tape reels 5, 6 against the bias of the torsion coil spring 29. This shifting of the reel lock lever 26 releases the thrusting of the tape reels 5, 6 by the thrust members 30, 30, so that these tape reels 5, 6 are free to rotate to enable the tape 7 to be reeled out of the cassette half 4.

On the upper surface of the cassette half 4 and at the transverse center towards the front lid 10 is formed a rectangular engaging recess 32. This recess is provided, in the tape cassette attachment device in which the tape cassette 1 is drawn from the tape cassette inserting and removing position to the tape cassette attaching position using a draw-in lever, so that an engaging pawl provided at the foremost part of the draw-in lever may be engaged with the recess.

The above described tape cassette 1 is attached at the tape cassette attachment position within the main body of the tape recorder by the medium of the cassette holder movable horizontally and vertically between the tape cassette inserting and removing position and the tape cassette attachment position.

The insertion and holding of the tape cassette 1 within the cassette holder results in the relative movement between the cassette half 4 and the closure plate 14 to open the reel drive shaft insertion openings 12, 13. On the other hand, the shifting of the cassette holder to the tape cassette attachment position results in the front lid 10 being turned to open the front side of the cassette half 4 to cause the tape 7 to be exposed and extracted to the outside.

The digital audio tape recorder provided with the rotary magnetic head device to which the present invention is applied is comprised, as shown in FIGS. 1 to 4, of a tape cassette attachment device including a cassette holder 35 into which the tape cassette 1 is inserted and held and a slide guide chassis 40 vertically movably supporting the cassette holder 35 and supported itself on the side of a mechanical chassis 36 constituting the main body of the tape recorder for sliding reciprocating movement. The frame 40 is adapted to cause a vertical movement of the cassette holder 36 between the first position in which the frame is slidingly reciprocated by a driving electric motor 37 to enable the tape cassette 1 to be inserted into and detached from the cassette holder 35 and the second position in which the reel drive shaft insertion openings 12 and 13 opened on the bottom surface of the tape cassette 1 and the reel drive shafts 38 and 39 on the mechanical chassis 36 are in register with each other.

On the side opposite to the tape cassette attachment position provided with the reel driving shafts 38, 39, there is provided a rotary magnetic head device 42 in which is wound the magnetic tape 7 extracted from the tape cassette 1 by the medium of the mechanical chassis 36. Between the tape cassette attaching position and the rotary magnetic head device 42, there are provided a pair of shift guide blocks 43, 44 constituting a loading mechanism for extracting the tape 7 from the tape cassette 1 and placing it about a tape guide drum of the rotary magnetic head device 42 for tape running. On these shift guide blocks 43, 44, there are provided a tape guide roll 45 and an inclined guide pin 46 about which the tape 7 is hooked and which guide and place the tape 7 about the tape guide drum of the rotary magnetic head device 42 over a predetermined angle of, for example, about 90°. These shift guide blocks 43, 44 are guided respectively by a pair of slide guide slots 47, 48 formed in the chassis 36 so as to be shifted from a position in which the roll 45 and the pin 46 face to the spacing 19 of the tape cassette 1 attached to the tape cassette attachment position to a position on the lateral side of the head device 42. The shifting of the shift guide blocks 43, 44 is effected by the rotational driving in the mutually different directions of loading rings 49, 49 placed one upon the other on the outer perimeter of the head device 42. These shift guide blocks 43, 44 are connected to loading rings 49, 49 by connecting arms, not shown, and are shifted by the loading rings 49, 49 being driven into rotation by the loading motor 52. Each loading ring 49, 49 is connected to the loading motor 52 so that the drive power may be transmitted via a connecting gearing 53 and a connecting belt 54.

Between the tape cassette attachment position and the rotary magnetic head device 42, there are rotatably mounted a pinch roll 56 pressured to a capstan shaft 55 to effect a constant speed driving of the magnetic tape 7, a tape guide supporting arm 57 and a tension regulating arm of a tension regulator, not shown. The pinch roll 576, tape guide support arm 57 and the tension regulating arm are rotationally actuated, by the loading rings 49, 49 shifting the shift guide blocks 43, 44, between a position towards the tape cassette attachment position and the position towards the magnetic head device 42, and are turned with the shifting of the shift guide blocks 43, 44 to place the tape 7 within the tape cassette 1 about the head device 42 to effect loading along a predetermined tape route.

Figure 2:
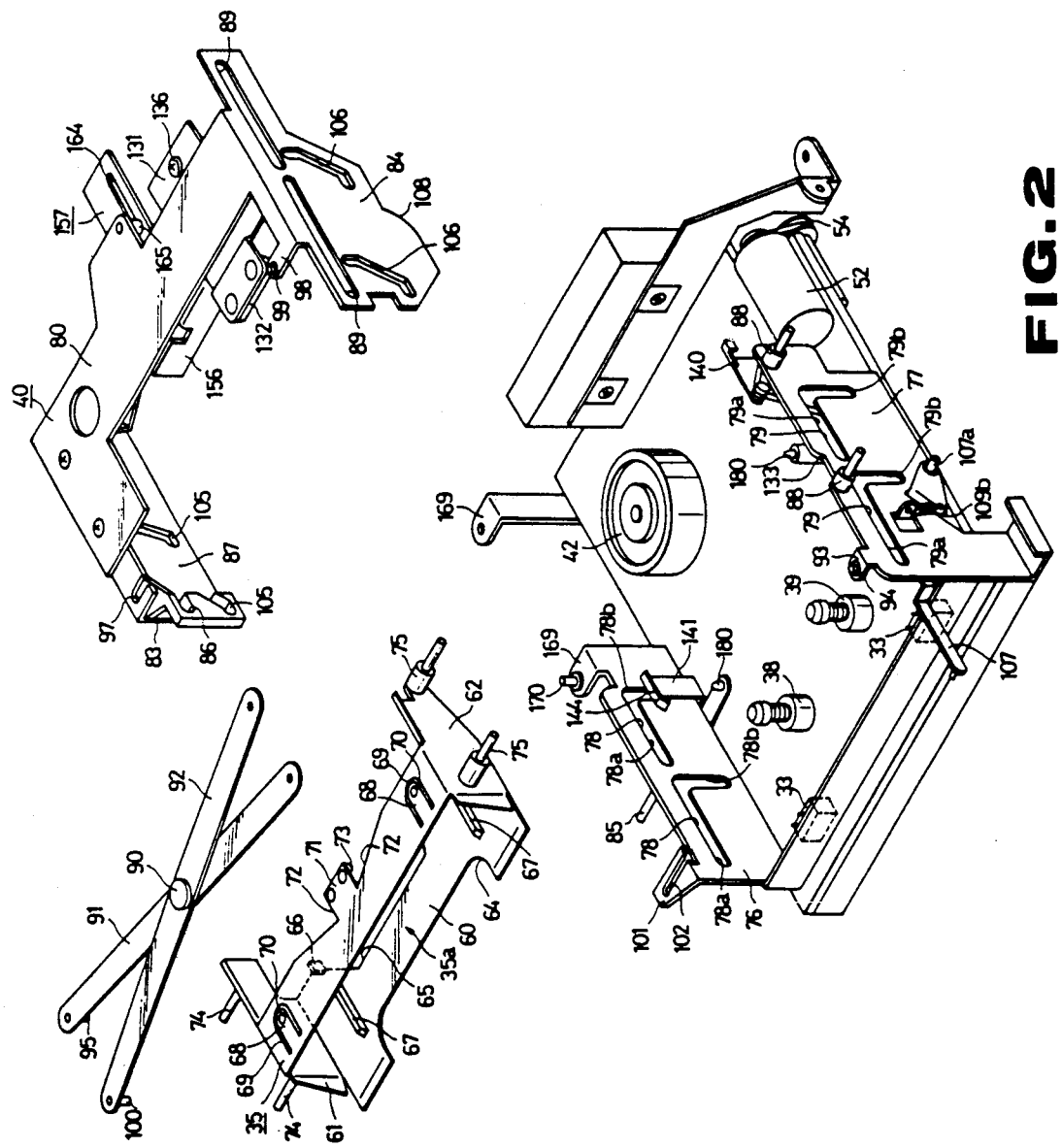
FIG. 2 is an exploded perspective view showing a tape cassette attachment device for the tape recorder shown in FIG. 1.

The tape cassette attachment portion on the chassis 36 provided with reel drive shafts 38, 39 is provided with tape cassette attachment sensor switches 33, 33 for sensing the attachment of the tape cassette 1, as shown in FIG. 2.

Figure 1:
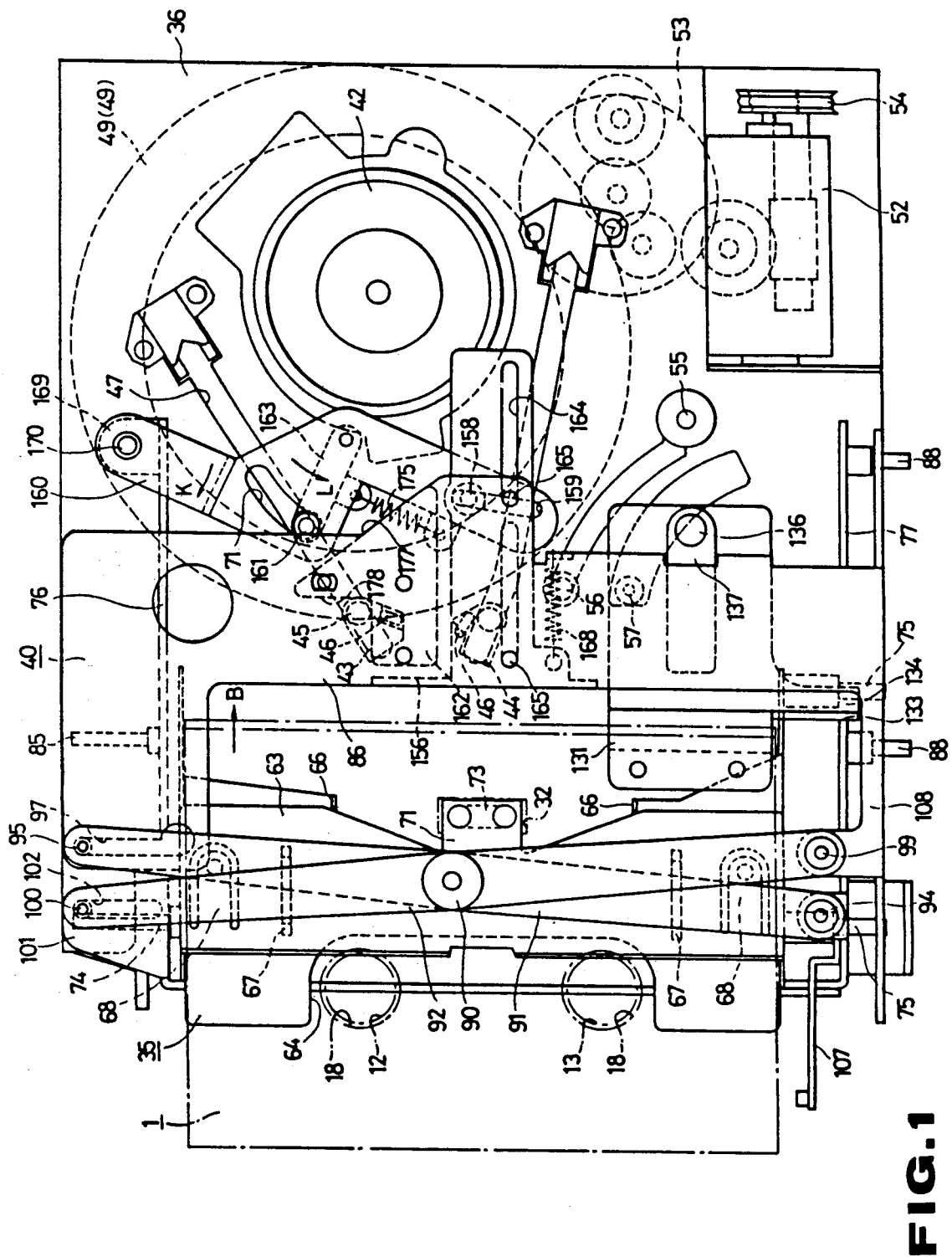
FIG. 1 is a plan view of a digital audio tape recorder to which the present invention is applied.

The above described cassette holder 35 constituting the cassette attachment device 41 is formed substantially as a box opened on the front and back sides to permit insertion and holding of the tape cassette 1. Thus, as shown in FIGS. 1 and 2, the cassette holder 35 is formed substantially as a box by a bottom plate 60 on which is placed the tape cassette 1, upright side plates 61 and 62 on both sides of the bottom plate 60 and an upper side plate 63 opposite to the bottom plate 60 and provided between the side plates 61 and 62. At the center on the forward side edge of the bottom plate 60 is formed a recess 64 into which are intruded reel drive shafts 38, 39 mounted with a transverse spacing in-between. At the center on the rearward edge is formed a trapezoidal recess 65, on both side edges of which are formed slide regulating lugs 66, 66 abutting on the lugs 15, 15 of the closure plate 14 of the tape cassette 1 to regulate the shifting of the closure plate 14. Towards the side plates 61, 62, the bottom plate 60 is provided with a pair of projecting ribs 67, 67 for thrusting a lock member 21 retaining the closure plate 14 of the tape cassette 1.

The upper side plate 63 formed with a pair of cassette thrusting members 68, 68 resiliently pressuring and supporting the upper surface of the tape cassette 1 inserted and held by this cassette holder 35 so that the thrusting members extend in the inserting direction of the tape cassette 1. These thrusting members are formed integrally with the upper plate 63 by forming U-shaped slits 69, 69 so that the thrusting members may be deformed resiliently. To the foremost parts of the cassette thrusting supporting plates 68, 68 are provided tape cassette thrusting projections 70, 70 of synthetic resin for protruding into the inside of the cassette holder 35. The cassette thrusting plate supporting members 68, 68 are provided at transversal symmetrical positions for uniformly pressuring the points in the vicinity of the recesses 20, 20 formed in the closure plate 14 towards both sides of the upper surface of the tape cassette 1 inserted and held in the cassette holder 35.

At the center on the back side of the upper plate 63 is provided an engaging thrusting support member 71 engaging with a recess 32 on the upper surface of the cassette half 4 of the tape cassette 1 for resiliently thrusting and supporting the tape cassette 1. This support member 71 is resiliently formed so as to be projected from one rear side of the upper surface plate 63 by forming a pair of slits 72, 72 on one rear side of the plate 63. The foremost part of the support member 71 is provided with an engaging projection 73 of synthetic resin engaging with an engaging recess 32 on the upper surface of the cassette half 4. This projection 73 is provided at a position of engaging with the recess 32 only when tape cassette 1 is inserted and held in the cassette holder 35 as the closure plate 14 is retained by the slide control lugs 66, 66 and the cassette half 4 performs a relative movement with respect to the closure plate 14 to expose the reel drive shaft insertion openings 12 and 13.

Figure 3:
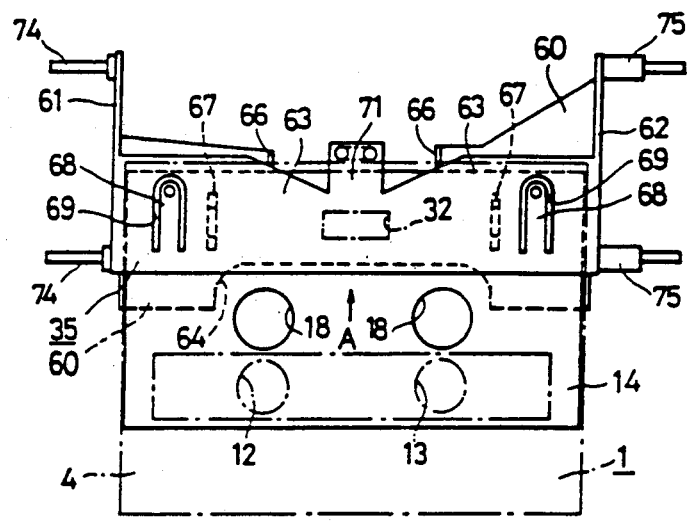
FIG. 3 is a plan view showing the state of inserting a tape cassette into a cassette holder constituting the tape recorder shown in FIG. 1.
Figure 4:
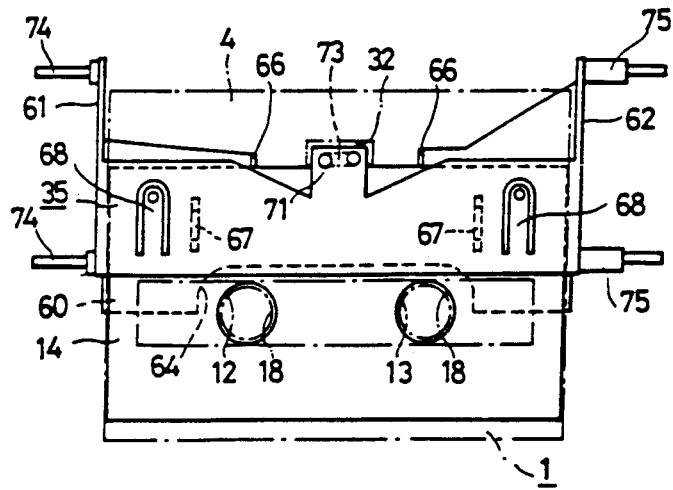
FIG. 4 is a plan view showing the state in which the tape cassette is inserted into and held in the cassette holder.

The tape cassette 1 is inserted from the side of the front lid 10 into the above described cassette holder 35, as shown in FIG. 3. As the tape cassette 1 is inserted in the direction of the arrow mark A in FIG. 3 along the bottom plate 60 of the cassette holder 60, the tape cassette 1 is inserted as it is regulated by side plates 61 and 62 of the cassette holder 35 with respect to the transverse inserting position, until it is clamped by the bottom plate 60 of the cassette holder 35 and a pair of cassette thrusting support members 68, 68, as shown in FIG. 3. As the cassette holder 35 is inserted into the interior of the cassette holder 35 in the direction of the arrow mark A in FIG. 3, the ribs 67, 67 on the bottom plate 60 are guided by the recesses 20, 20 of the closure plate 14 of the tape cassette 1 to raise the lock member 21 retaining the closure plate 14 with the cassette half 4 inwardly of the cassette half 4 to release the retention of the closure plate 14 at the position of closing the reel drive shaft insertion openings 12, 13. Following the releasing of the retention of the closure plate 14, the slide control projections 66, 66 at the rear side of the bottom plate 60 abut on the lugs 15, 15 formed at the forward side of the closure plate 14 to regulate the movement of the closure plate 14 in the direction of the arrow mark A in FIG. 3. When the tape cassette 1 is further inserted into the cassette holder 35 in the direction of the arrow mark A in FIG. 3, since the time when the movement of the closure plate 14 is regulated, only the cassette half 4 is moved further into the inside of the cassette holder 35, as shown in FIG. 4. By this relative movement of the cassette half 4 and the closure plate 4, the reel drive shaft insertion openings 12, 13 of the cassette half 4 and the insertion openings 18, 18 of the closure plate 14 are in register with each other to open the reel drive shaft insertion openings 12, 13. The position of insertion of the cassette half 4 until the opening of the reel drive shaft insertion openings 12, 13 represents the insert hold position of the tape cassette 1 into the cassette holder 3 in which the reel drive shaft insertion openings 12, 13 and the recesses 64 on the bottom plate 60 are in register with each other to enable the reel drive shafts 38, 39 to be engaged with the tape reels 5, 6.

When the reel drive shaft insertion openings 12, 13 are opened for insertion and holding of the tape cassette 1, as described above, the thrusting support member 71 thrusts and supports the tape cassette 1, with the end engaging projection 73 engaging in the engaging recess 32 on the upper surface of the cassette half 4. Therefore, the tape cassette 1, inserted into the cassette holder 31, is held by the cassette holder 71, as the cassette half 4 is thrusted and supported on both sides thereof by a pair of cassette thrusting and supporting members 68, 68 and at the transverse center thereof by the engaging thrust support member 71. As a result, the tape cassette 1 is inserted and held in the stable state, as the tape cassette is prevented from floating in the vicinity of the center of the cassette holder 35 and brought into intimate contact with the bottom plate 60 after correction of the deformation, if any, of the tape cassette. Above all, the cassette holder 35 provides for holding of the tape cassette 1 with the engaging recess 32 on the upper surface of the cassette half 4 interengaging with, the engaging projection 73 at the end of the engaging thrust support member 71 so that the insert and hold position of the tape cassette 1 is regulated accurately while the tape cassette 1 is adapted to be prevented from accidental dropping to provide for reliable holding of the tape cassette 1.

Figure 5:
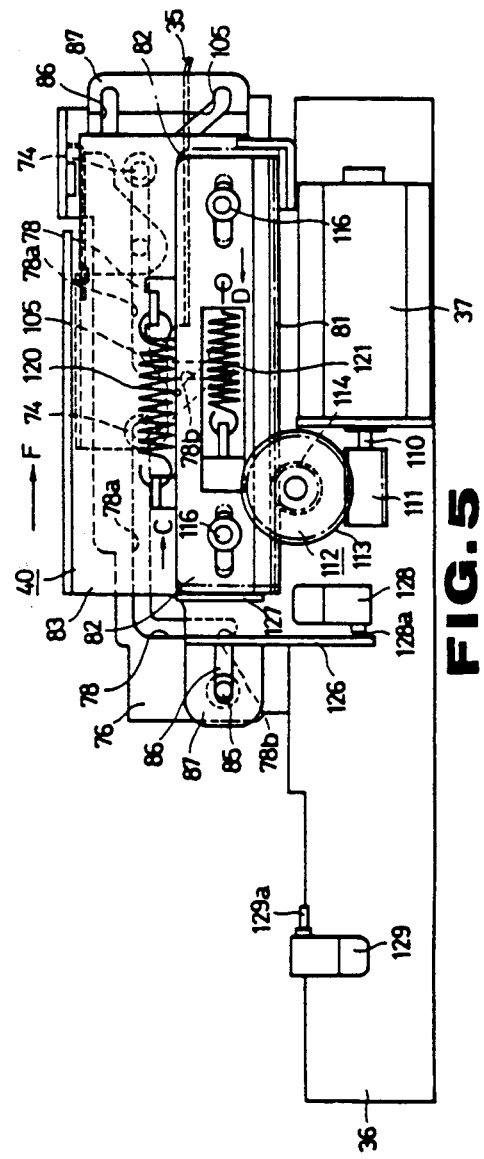
FIG. 5 is a left-hand side elevational view showing the cassette holder in its first position.

The cassette holder 35 into which the tape cassette 1 is inserted and held is mounted as shown in FIGS. 2, 5 and 6, as the slide guide support pins 74, 74, 75, 75 formed on the upper edge sides of the side plates 61, 62 are inserted into and supported by slide guide slots 78, 78, 79, 79 in the supporting side plates 76, 77 provided on both sides of the chassis 36.

Meanwhile, the slide guide slots 78, 78, 79, 79 are formed in the shape of a letter L, as shown in FIG. 2, by horizontal slide guide slot sections 78a, 78a, 79a, 79a formed from the front end sides of the supporting side plates 76, 77 towards the inner mid portion and vertical slide guide sections 78b, 78b, 79b, 79b formed vertically downwards from the inner side ends of these slot sections 78b, 78b, 79b, 79b. The cassette holder 35, having the slide guide support pins 74, 74, 75, 75 inserted into and supported by the above guide slots 78, 78, 79, 79, is shifted in the horizontal direction between a first position enabling the insertion and detachment of the tape cassette 1 and a second position of having the reel drive shaft inserting openings 12, 13 opened in the bottom surface of the tape cassette 1 in register with the reel drive shafts 34, 35 and in the vertical direction of engaging and disengaging the tape reels 5 and 6 with respect to the drive shafts 34 and 35, as the slide guide support pins 74, 74, 75, 75 are shifted and guided from the forward end sides of the horizontal guide slot sections 78a, 78a, 79a, 79a to the vertical guide slot sections 78b, 78b, 79b, 79b of the slide guide slots 78, 78, 79, 79.

The above described shifting of the cassette holder 35 in the horizontal and vertical directions under the guidance of the slide guide slots 78, 78, 79, 79 is performed by the reciprocating movement of the slide guide slot 40 supported for horizontal reciprocating sliding movement by the medium of the reciprocating sliding movement of the supporting side plates 76, 77. As shown in FIGS. 2 and 5, the slide guide frame 40 adapted for shifting the cassette holder 35 has the shape of a letter U and is formed on its one side with a depending rack gear attachment side plate 83 and on its other side with a slide side plate 84. The rack plate 82 formed on its one side with a rack gear 81 to which a drive power is transmitted from the drive motor 37. On the inner surface facing to the slide side plate 84 of the rack gear attachment side plate is mounted a slide guide block 87 of synthetic resin in which there are longitudinally formed a pair of slide guide slots 86, 86 engaged by a pair of slide guide pins 85, 85 provided to the support side plate 76. A pair of slide guide slots 89, 89 are formed longitudinally in the slide guide plate 84, these slots 89, 89 being engaged by a pair of slide guide pins 88, 88 provided to the other support side plate 77. The slide guide frame 40 is mounted for bridging between the support side plates 76 and 77, with the slide guide pins 85, 85 engaging with the slide guide 86, 86 formed in the slide guide block 87 and with the slide guide pins 88, 88 engaging in the slide guide slots 89, 89 formed in the slide side plate 84.

Referring to FIG. 2, the slide guide frame 40 is connected to the support side plates 76, 79 by a pair of opening/closure arms 91, 92 having its center portion supported by a pivot shaft 90 so that the slide guide frame may perform a positive reciprocating sliding movement while being maintained in the horizontal position with respect to the chassis 36. The one arm 91 has its one end turnably supported by a fixed supporting shaft 94 provided on an attachment supporting piece 93 bent on the front side upper surface of the other supporting side plate 77 as shown in FIG. 2. The arm 91 is formed at the other end with a depending guide shaft 95 which is engaged in an elongated aperture 97 formed in a bent piece 96 integral with the upper edges of the side plate 83 of the slide guide frame 40., The aperture 97 has its long axis lying orthogonally to the shifting direction of the slide guide frame 40. The other arm 92 interconnects the slide guide plate 40 and the support side having its one end turnably supported by a fixed support shaft 99 provided to a mounting support shaft 98 bent on the upper edge of the slide guide side plate 84 of the slide guide frame 40 and by having its other end formed with a depending guide shaft 100 engaging in an elongated aperture 102 formed in a bent piece 101 formed at the upper edge of the forward side of the support side plate 76. The aperture 102 has its long axis lying in a direction orthogonal to the shifting direction of the slide guide frame 40.

The opening/closure arms 91, 92, having their one ends supported by the fixed supporting shafts 94, 99 and having the guide shafts 95, 100 at the other ends engaged in the apertures 97, 102, are operated for opening/closure about the pivot 90 as center, as the guide shafts 95, 100 are slidingly guided by the apertures 97, 102, with the ends thereof pivotally supported by the fixed shafts 94, 99 as the fixed supporting points The slide guide frame 40, thus connected to the support side plates 76, 77 by the opening/closure arms 91, 92 in turn supported at the one ends by the fixed support shafts 94, 99, is slidingly reciprocated parallel to the chassis 36 with the side of the fixed support shafts 94, 99 as the slide reference.

The cassette holder 35 is supported by the slide guide frame 40, thus reciprocatingly supported with respect to the chassis 36, so that the cassette holder may be moved both horizontally and vertically to follow up with the reciprocating sliding of the slide guide frame 40. Thus the cassette holder 35 is supported by the slide guide frame 40 so that it is moved in the horizontal direction between the first position of enabling the insertion and removal of the tape cassette 1 shown in FIGS. 1, 5 and 6 and the second position in which the reel drive shaft insertion openings 12, 13 on the bottom side of the tape cassette 1 and the reel drive shafts 38, 39 are in register with each other as shown in FIGS. 7 and 8 and in the vertical direction for engagement and disengagement of the tape reels 5, 6 with respect to the reel drive shafts 38, 39 as shown in FIGS. 8 to 11.

Figure 6:
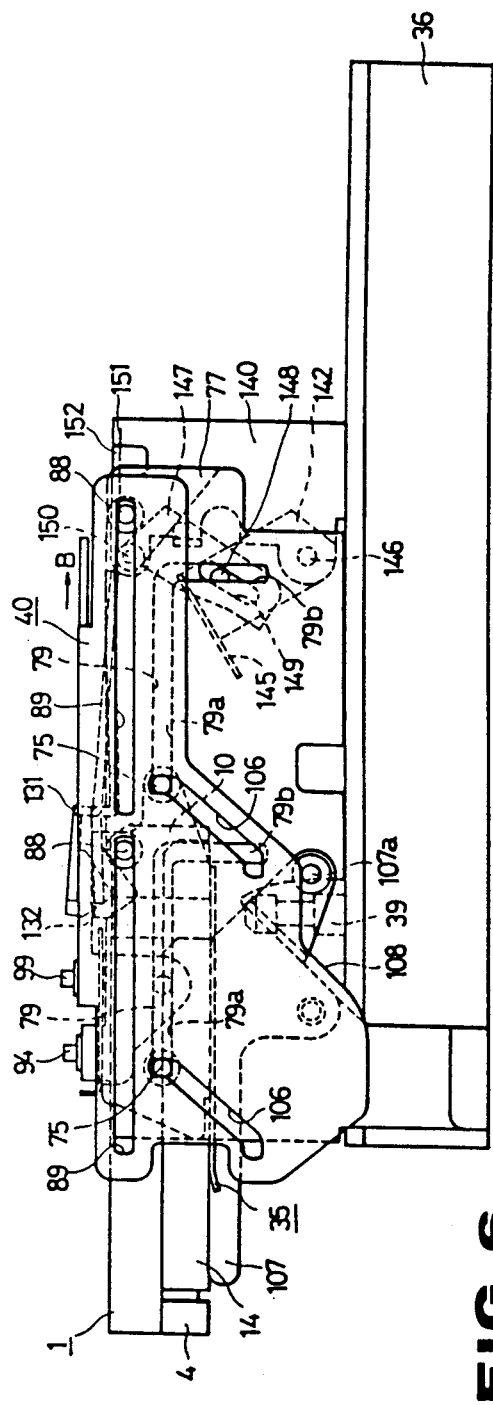
FIG. 6 is a right-hand side elevational view showing the cassette holder in its first position.

The slide guide block 87 and the slide side plate 84 of the slide guide frame 40 are formed with a pair of inclined cam slots 105, 105 and another pair of inclined cam slots 106, 106, respectively, as shown in FIGS. 2, 5 and 6. The cassette holder 35 is supported by the slide guide frame 40 so as to be shifted horizontally and vertically, as discussed hereinabove, by that the foremost parts of the slide guide support pins 68, 68, 73, 73 inserted in the slide guide slots 72, 72, 73, 73 formed in the support side plates 76, 77 are engaged in the inclined cam slots 105, 105, 106, 106.

Figure 8:
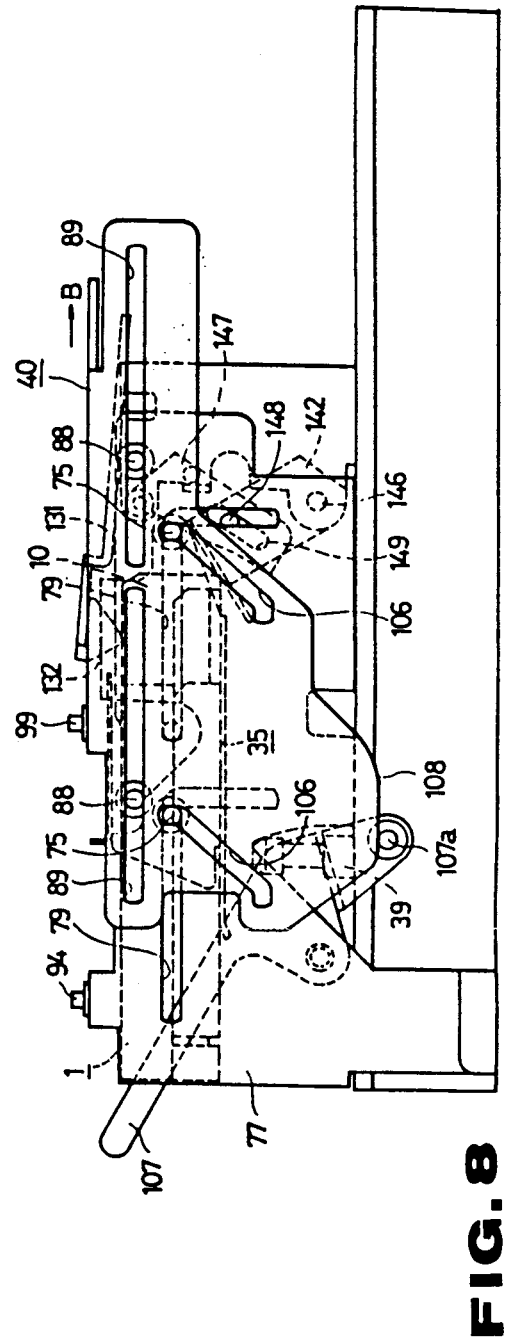
FIG. 8 is a right-side elevational view showing the state in which the cassette holder is moved to its second position.
Figure 7:
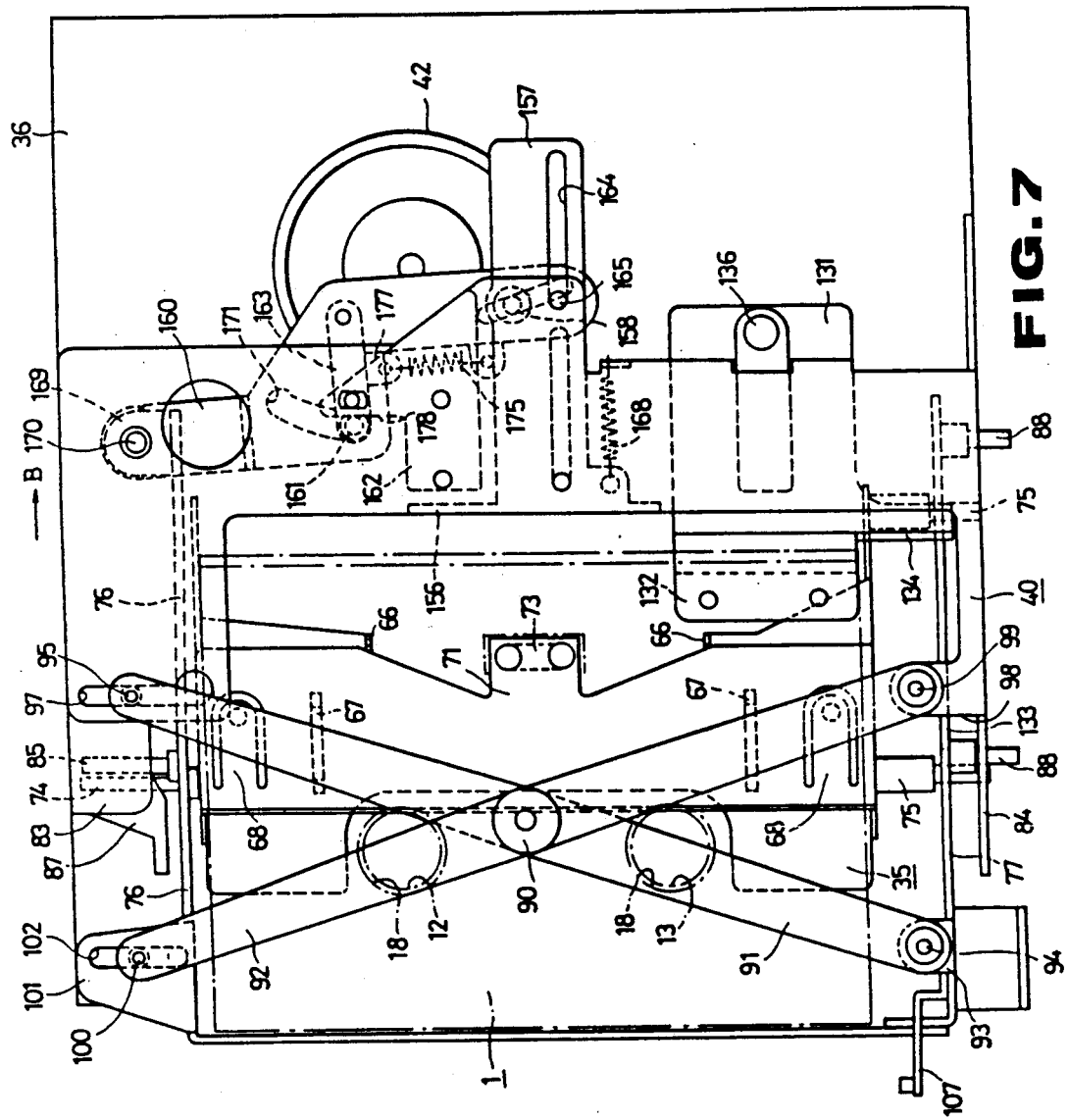
FIG. 7 is a plan view showing the state in which the cassette holder, is moved to its second position.

While the paired opening/closure arms 91, 92 are opened as shown in FIGS. 7 and 9, and while the slide guide pins 85, 85, 88, 88 are reciprocated along the direction shown by the arrow mark B shown in FIGS. 1 and 6 within the extent of the slide guide slots 86, 86, 89, 89, the slide guide frame 40 shifts the cassette holder 35 from the first position of enabling the insertion and removal of the tape cassette 1, shown in FIGS. 1 and 6, in which the cassette holder is advanced with respect to the chassis 36, to the second position of registry of the reel drive shaft insertion openings 12, 13 on the bottom surface of the tape cassette 1 inwardly of the chassis 36 with the reel drive shafts 34, 35, as shown in FIGS. 7 and 8, as the slide guide support pins 74, 74, 75, 75 are guided along the slide guide slots 78, 78, 79, 79, at the same time that the slide guide frame also lowers the cassette holder in the above second position into engagement with the reel drive shafts 34, 35. Thus, when the slide guide frame 40 is moved to a position advanced with respect to the chassis 36 in which, with the opening/closure arms 91, 92 being opened, the slide guide pins 85, 85, 88, 88 are positioned towards the inner ends of the slide guide slots 86, 86, 89, 89, the cassette holder 35 is supported at the first position in which the slide guide support pins 74, 74 and 75, 75 are positioned at the forward side of the slide guide slots 78, 78, 79, 79.

The inclined cam slots 105, 105, 106, 106 are so designed that, when the slide guide frame 40 and the cassette holder 35 are in the first position shown in FIGS. 1 and 6, the slide guide support pins 74, 74, 75, 75 are engaged at the upper edges of the cam slots so that this engaging state is maintained during the time when the cassette holder 35 is shifted from the first position to the second position shown in FIGS. 7 and 8 to effect the shifting in unison with the slide guide frame 40. Thus, after the cassette holder 35 reaches the second position shown in FIGS. 7 and 8, the slide guide frame 40 must be shifted in the reciprocating direction shown by the arrow mark B in FIGS. 7 and 8, and the cassette holder 35 must be lowered towards the tape cassette attachment position, with the slide guide support pins 74, 74, 75, 75 being guided in the vertical slide guide slot sections 72b, 72b, 73b, 73b of the slide guide slots 72, 72, 73, 73. To this effect, the inclined cam slots 105, 105, 106, 106 are formed with a predetermined angle of inclination from the upper towards the lower edges of the slide guide block 87 and the slide side plates 84, through the height range of the vertical guide slot sections 72b, 72b, 73b, 73b, as shown in FIGS. 5 and 6. The inclination angle of these cam slots 105, 105, 106, 106 corresponds with that of the oblique side of an isosceles triangle having the height of the slot sections 72b, 72b, 73b, 73b as its one side, and is so selected as to lower the cassette holder 35 towards the tape cassette attachment position as the slide guide frame 40 is reciprocated through the height of the vertical guide slot sections 72b, 72b, 73b, 73b.

A cam surface 108 for opening/closure of the lid opening/closure arm is formed on the forward lower edge of the slide side plate 84 of the slide guide frame 40 for turning the lid opening/closure arm 107 adapted for opening/closure of the opening/closure lid adapted in turn for opening/closure of the tape cassette insertion and removal opening formed on the forward side of the outer casing. The lid opening/closure arm 107 is rotatably supported by the other support side plate 77 and is rotationally biased by a tension spring 109 so that the engaging pin 107a projectingly mounted at the proximal side is brought into pressure engagement with the cam surface 108. This lid opening/closure arm 107 is rotationally actuated by that the engaging pin 107a is moved on the cam surface 108 by the reciprocating movement of the slide guide frame 40, for thereby opening or closing the opening/closure lid adapted for opening/closure of the tape cassette inserting/removal opening. The slide guide frame 40, reciprocatingly driven with respect to the chassis 36 to effect the shifting of the cassette holder 35, is actuated for reciprocation, by a driving electric motor 37 mounted to the lower edge of the chassis 36 as shown in FIG. 5.

The driving motor 37 and the slide guide frame 40 are interconnected, as shown in FIG. 5, with an intermediate gear 112 meshing with a worm gear 111 mounted on an output shaft 110 of the driving motor 37 and with a rack gear 81 of a rack plate 82 provided on the outer lateral side of a rack gear attachment side plate 83 of the slide guide frame 40. This intermediate gear 112 is formed by a large diameter bevel gear 113 and a small diameter pinion 114 integrally and coaxially with each other, as shown in FIG. 12, with the bevel gear 113 meshing with the worm gear 111 and the pinion 114 meshing with the rack gear 81 for interconnecting the worm gear 111 and the rack gear 81.

Figure 12:
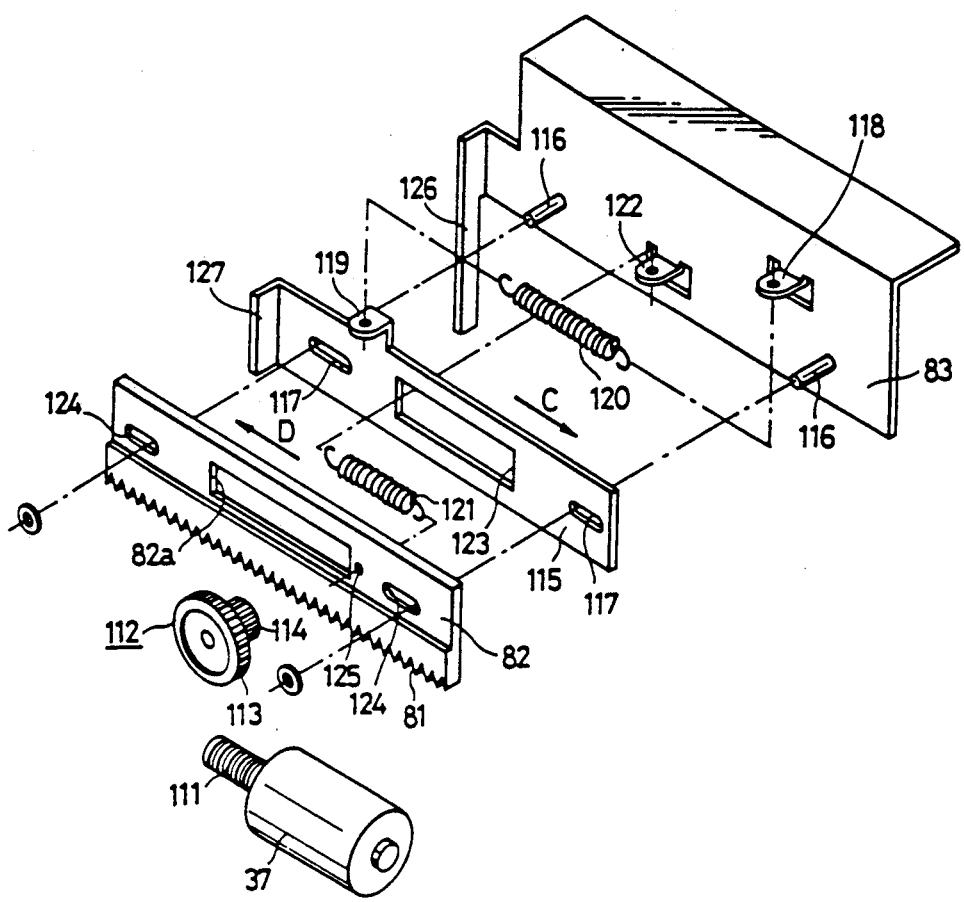
FIG. 12 is an exploded perspective view showing a unit for reciprocating the ,slide guide frame.
Figure 13:
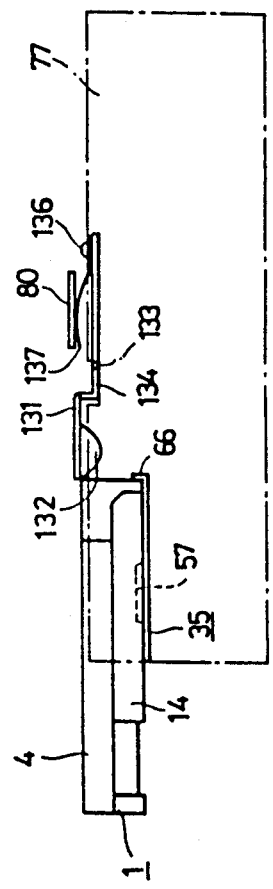
FIGS. 13 and 14 are diagrammatic side elevational views showing a unit for sensing tape cassette insertion and support, FIG. 13 showing the state in which the tape cassette is introduced and the slide guide frame is locked, and FIG. 14 showing the state in which the tape cassette is introduced and sensed and the slide guide frame is released from its locked state.

The rack plate 82 is attached to the rack gear attachment side plate, as shown in FIG. 12, by the medium of a rack supporting plate 115 supported on the outer lateral side of the rack gear attachment side plate 83.

The rack supporting plate 115 supporting the rack plate 82 is supported by that a pair of support pins 116, 116 on the rack attachment side plate 83 are passed through engaging guide openings 117, 117 each having its long diameter lying along the longitudinal direction, and is connected to and supported by the side plate 83 as it is biased in the direction shown by the arrow mark C in FIGS. 5 and 12, or in the returning direction of the slide guide frame 40, by means of a first limiting coil spring 120 installed under tension between a first retainer 118 on the side plate 83 and a second retainer 119 on the upper edge of the rack supporting plate 115. The bias shift position of the rack supporting plate 115 is regulated by that the rear edge of a rectangular cut-out opening 123 in the planar surface of the supporting plate 115 is retained by a third retainer 122 on the side plate 83 retaining one end of a second limiting spring 121 adapted to bias the rack plate 82. The rack plate 82 is supported in the manner of overlying the rack supporting plate 115, as the ends of the supporting pins 116, 116 supporting the rack support plate 15 are inserted into engagement guide openings 124, 124 each having the long axis in the longitudinal direction. The rack plate 82 is biased in the direction shown by the arrow mark D in FIGS. 5 and 12, which is the reverse of the bias shift direction of the rack support plate 115, that is, the forward direction of the slide guide frame 40, by the second limiting spring 121 installed under tension between a third spring 122 at the rectangular cut-out 82a in the planar surface of the rack plate 82 and the spring retainer opening 125 in the rack plate 82, at the same time that it is connected to the rack gear attachment side plate 83 by the medium of the rack support plate 115, by that the end of the rack plate in the bias shift direction by the second limiting spring 121 abuts on the retainer 127 at one end of the rack supporting plate 115.

Figure 11:
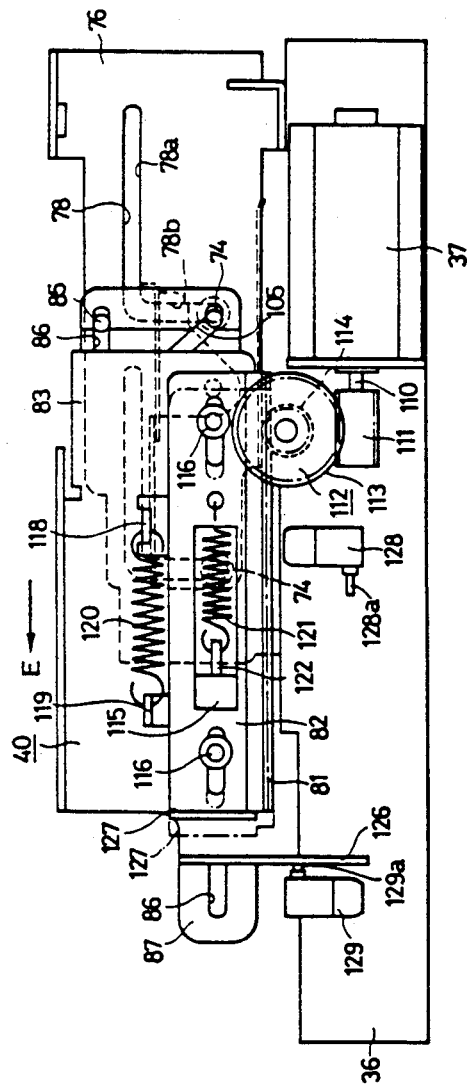
FIG. 11 is a right-hand side elevational view showing the state in which the cassette holder is moved to the tape cassette attachment position.

As the driving motor 37 is rotationally driven for reciprocating the slide guide frame 40 in the direction shown by the arrow mark E in FIG. 11, this drive power is transmitted to the slide guide frame 40 by the medium of the first limiting spring 120 adapted to bias the rack support plate 112 by the medium of the rack plate 82. As the drive motor 37 is driven for shifting the slide guide frame 40 in the returning direction shown by the arrow mark F in FIG. 5, this driving force is transmitted to the slide guide frame 40 by the medium of the first limiting spring 121 adapted to bias and shift the rack plate 82.

Figure 10:
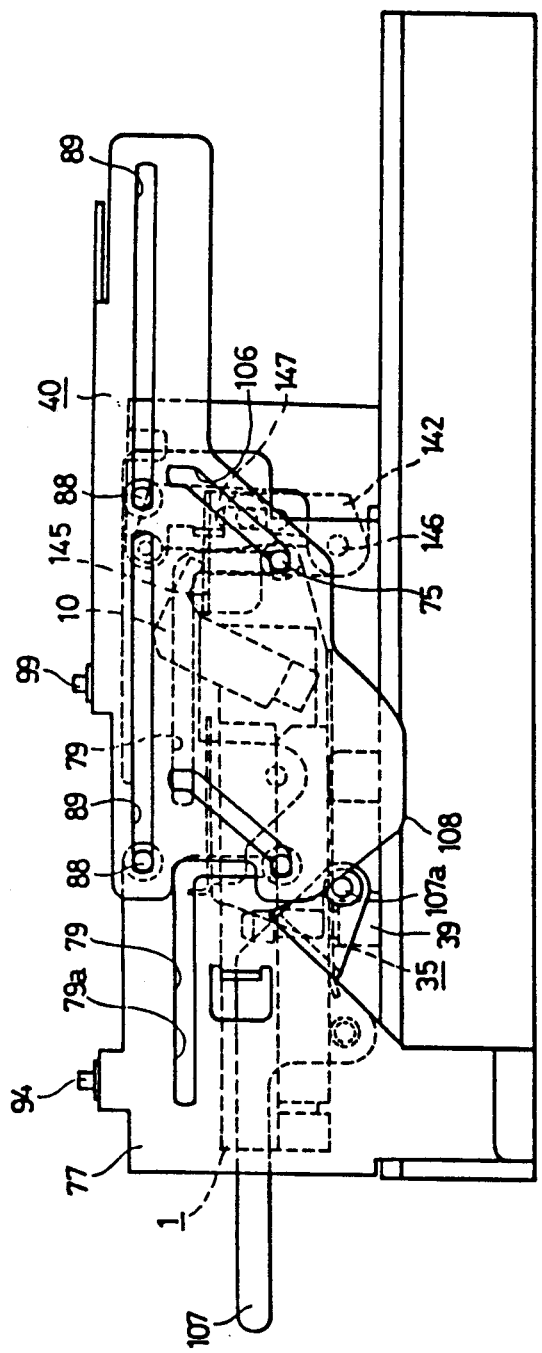
FIG. 10 is a right-hand side elevational view showing the state in which the cassette holder is moved to the tape attachment position.

The starting and stopping of the driving motor 37 adapted to reciprocate the slide guide frame 40 is effected by a return position sensor switch 128 and a tape cassette attachment sensor switch 129, provided or the one side of the chassis 32 as shown in FIGS. 5 and 11. The return position sensor switch 128 is provided at such a position in which a thrust piece 128a is thrusted by a switch operating member 126 when the slide guide frame 40 is positioned at the forward side of the chassis 36 after shifting the cassette holder 35 to its first position, as shown in FIGS. 1, 5 and 6. The tape attachment position sensor switch 129 is mounted at a position such that a thrust piece 129a is thrusted by the switch actuator 126 when the thrust guide frame 40 is at it is retracted position shown in FIGS. 9, 10 and 11 in which it is positioned inwardly of the chassis 36 after lowering the cassette holder 35 to its tape attachment position. When the tape cassette is inserted into and held in the cassette holder 35, with the switch guide frame 40 at the return position, the switch guide frame 40 is shifted slightly inwardly as later described, and the thrusting by the thrusting piece 128a of the switch 128 by the switch actuating piece 126 is released, the driving motor 37 starts to be driven in the forward direction for shifting the slide guide shaft 40 forwards. As the slide guide frame 40 is shifted forwards by this driving of the motor 37, the cassette holder 35 is lowered to the tape cassette attachment position, and the tape cassette inserted and held in the cassette holder 35 is attached in the tape cassette attachment position, as shown in FIG. 10, it is sensed that the thrust piece 129a of the tape cassette attachment position sensor switch 129 is thrusted by the switch operating member 126 and thus brought to its retracted position, the driving of the driving motor 35 then being terminated. At this time, the slide guide pins 85, 85, 88, 88 abut on the foremost part of the slide guide slots 86, 86, 89, 89, as shown in FIGS. 10 and 11, so that the shifting of the slide guide frame 40 is regulated in the forward direction. When an eject button, not shown, provided to the main body of the apparatus, is actuated while the slide guide frame 40 is at the retracted position after the cassette holder 35 is lowered to the tape cassette attachment position, the driving motor 37 is driven in reverse to return the slide guide frame towards the return position. It is then sensed that the thrust piece 128a of the tape cassette attachment position sensor 128 is thrusted and brought to its retracted position by the switch actuating member 126, and the driving of the motor 37 is then terminated. At this time, the slide guide pins 85, 85, 88, 88 abut on the rear ends of the slide guide slots 86, 86, 89, 89, as shown in FIGS. 10 and 11 to regulate the movement of the slide guide frame 40 in the returning direction.

When the driving motor 37 driven without being stopped immediately after the slide guide frame 40 reaches the retracted position with the cassette holder 35 having been lowered to the cassette attachment position, the rack plate 82 is rendered integral with the rack supporting plate 115, as shown by the phantom line in FIG. 11 and is shifted with respect to the slide guide frame 40, while expanding the first limiting spring 121, to prevent overloading of the slide guide frame 40. When the driving motor 37 is driven without being stopped immediately after the slide guide frame 40 reaches the forward end of the chassis 36, with the cassette holder 35 having been shifted to the first position, the rack plate 82 is shifted with respect to the slide guide frame 40, as shown by the phantom line in FIG. 5, while expanding the second limiting spring 21, to prevent overloading of the slide guide frame 40. When the driving motor 37 is driven further after the slide guide frame 40 is moved to the retracted position or to the forward end position of the chassis 36, and when the driving motor 37 is completely stopped after the rack plate 82 is shifted with respect to the slide guide frame 40, the rack plate 82 is biased and shifted to its return position by the first or second limiting springs 121 or 122. The intermediate gear 112 is also turned in the return direction, by this movement of the rack plate 82 in the returning direction, to prevent the so-called tightening caused by nipping of the bevel gear 113 to the pinion 111.

In order to provide for protection of the tape cassette 1 and the reel drive shafts 38, 39 on the tape recorder and to provide for positive attachment to the tape cassette attachment position, there is also provided a tape cassette insertion holding sensor unit for enabling the shifting of the slide guide frame 40 only when it is detected that the tape cassette 1 is inserted and held in the cassette holder 35 while the closure plate 14 is shifted and the reel drive shaft insertion openings 12, 13 are opened.

Referring to FIG. 2, this tape cassette insertion holding sensor unit is comprised of a tape cassette insertion sensor plate 131 attached to the lower surface of a connecting supporting plate 80 of the slide guide frame 40 towards the slide side plate 84. This sensor plate 131 is provided on its end with a mating thrust section 132 thrusted by the upper surface of the tape cassette 1 inserted into the cassette holder 1, while being also provided on its one side with a projecting locking member 134 engaging in a recessed locking section 133 on the upper surface of the other support side plate when the slide guide frame 40 is at the forward side of the chassis 36 after having shifted the cassette holder 35 to the first position The mating thrust section 132 is comprised of a semi-cylindrical section of synthetic material secured to the lower surface at the end of the cassette insertion sensor plate 131. The tape cassette insertion sensor plate 131 has its proximal side secured by a set screw 136 to the end of a spring plate 137 attached to the lower side of the connecting support plate 80 so that it is biased to turn about a support point established by the set screw 136 in such a manner that the mating thrust section 132 will be protruded into the inside of the cassette holder 35. Thus, when the slide guide frame 40 is at the forward side of the chassis 36 after having shifted the cassette holder 35 to the first position, the tape cassette insertion sensor plate 131 thrusts and biases the locking member 134 upwards, as shown in FIG. 1, into engagement with the locking section 133 to lock the forward shifting of the slide guide frame 40 with respect to the supporting side plate 77.

Meanwhile, the mating thrust section 132 of the tape cassette insertion sensor member 131 is provided at a position of being thrusted upwards only by the tape cassette 1 inserted and held in the cassette holder 35 with the reel drive shaft insertion openings 12, 13 being opened. That is, the mating thrust section 132 is provided at a position more inward in the main body of the apparatus than the slide control projections 66, 66 of the cassette holder 35 abutting on the lugs 15, 15 of the closure plate 14 to control the shifting of the closure plate 14, such that only the cassette half 4 shift with respect to the closure plate 14 and that has the reel drive shaft insertion openings 12, 13 opened completely can arrive at the mating thrust section 132.

The insertion of the tape cassette 1 by the above described tape cassette insertion holding sensor plate may be sensed in the following manner. Assuming that with the slide guide frame 40 at the forward side of the chassis 36 and the cassette holder 35 shifted to the first position as shown in FIG. 1, the tape cassette 1 is introduced from the side of the front lid 10, with the ribs 57, 57 of the bottom plate 60 of the cassette holder engaging in the recessed grooves 20, 20, until the lugs 15, 15 at the end of the closure plate 15 abut on the slide control projections 66, 66 of the bottom plate 10. At this time, the mating thrust section 132 slightly abuts on the forward end on the upper surface of the cassette half 4. However, at this time, the mating thrust section 132 only abuts on the cassette half 4 without being thrusted by the cassette half.

Figure 14:
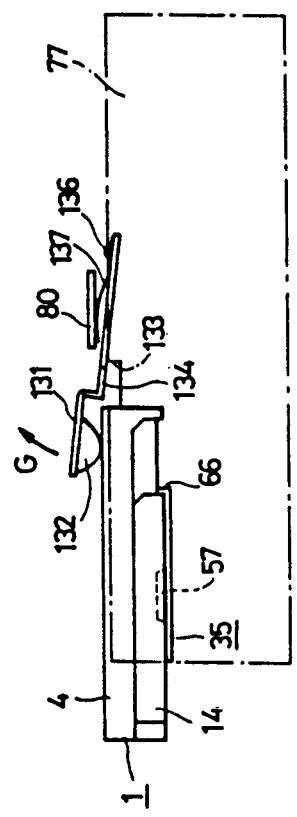

When the cassette half 4 is further inserted a predetermined amount into the inside of the cassette holder 4 with respect to the closure plate 14 for opening the reel drive shaft insertion openings 12, 13, the mating thrust section 132 is thrusted by the upper surface of the cassette half 4, the tape cassette insertion sensor member 131 being rotationally actuated upward along the arrow mark G in FIG. 14 against the bias of the spring plate 137. It is only when the reel drive shaft insertion openings 12, 13 are opened completely that the locking member 134 of the sensor plate 131 is disengaged from the locking section 133 on the support side plate 77 provided to the chassis 36. In other words, when the reel drive shaft insertion openings 12, 13 are not opened completely, the tape cassette insertion sensor plate 131 is turned only slightly without the locking member 134 being disengaged from the locking section 133. Thus the slide guide frame 40 is not inadvertently brought to its reciprocating state, and is not moved forwardly.

The slide guide frame 40 is unlocked and its forward movement is enabled. Such forward movement of the slide guide frame 40 enables the cassette guide frame 40 to be shifted towards the tape cassette attachment position of the cassette holder 35. That is, the forward movement of the slide guide frame 40 is enabled when the tape cassette 1 is inserted and held in the cassette holder 35, with the reel drive shaft insertion openings 12, 13 being opened.

The main body of the tape recorder is provided with a front lid opening unit adapted to open the front lid 10 of the tape cassette 1 against the bias of the torsion coil spring 11 in operative association with the attachment operation of the tape cassette 1 to the tape cassette attachment position. Thus front lid opening unit is made up of a pair of lid opening members 141, 142 adapted to turn the front lid 10 of the tape cassette 1 inserted into the cassette holder 35 in the opening direction when the cassette holder 35 is shifted by the slide guide frame 40 from the first position to the second position and the slide guide frame 40 is further moved forwards to lower the cassette holder 35 towards the tape cassette attachment position. As shown in FIGS. 2 and 6, these lid opening members 141, 142 are provided at the chassis 36 for facing to the cassette holder 35 shifted towards the tape cassette attachment position.

The lid opening member 141 is fixedly mounted to the chassis 36 in such a manner that the thrust section 144 provided at the end side will face to the lower edge of one side of the front lid 10 of the tape cassette 1 inserted and held in the cassette holder 35 which is at the aforementioned second position. When the cassette holder 35 is lowered towards the tape cassette attachment position, the thrust section 144 is abutted on the lower end edge of the front lid 10 of the tape cassette 1 to turn the front lid 10 in its opening direction against the bias of the torsion coil spring 11.

Referring to FIG. 15, the other lid opening member 142 is a L-shaped plate provided at its end with a thrust section 145 abutting on the other lower edge of the front lid 10 of the tape cassette 1 for turning the lid 10 and is turnably mounted with the proximal side thereof being supported on a pivot shaft 146 provided to the lower position of a mounting plate 140 of the chassis 36. This other lid-opening member 142 is connected to a rotating plate 147 which is turned by an inner slide guide supporting pin 75 adapted to support the cassette holder 35 by the attachment plate 140 when the cassette holder 35 is lowered. That is, the other lid opening member 142 is connected to the rotating plate 147 with a guide pin 148 on the one side inserted and engaged in an elongated aperture 149 formed on the main surface of the plate 147. The lid opening member 142 is turned about the pivot shaft 146 as the center as the plate 147 is turned and the guide pin 148 is slid and guided within the aperture 149. The plate 147 is rotatably mounted with one side of the proximal side thereof pivotally mounted to a pivot shaft 150 on the outer upper edge of the other supporting side plate 77. The plate 147 is biased into turning in the direction of the arrow mark H in FIG. 15 by a torsion coil spring 151 so that the mating rotating section 154 on the lateral side is positioned in the shifting trajectory of the slide guide support pin 75. The torsion coil spring 151 is wound about the pivot shaft 150 and has its one arm section 151a retained by a spring retainer 152 at the upper edge of the side plate 140 while having its other arm 151b retained by a spring pin 153 provided to the plate 147. The other lid opening member 142 connected to the rotating plate 147 is biased to be turned by the rotary biasing of the rotating plate 147 so that the end thrust section 145 is extended in the descending direction of the cassette holder 31 to face to the lower edge of the front lid 10 of the tape cassette 1. As the cassette holder 35 is lowered from the second position shown in FIG. 8 towards the tape cassette attachment position shown in FIG. 10, the mating rotating section 154 is thrust by the slide guide supporting pin 75, with the rotating plate 147 being turned in the direction opposite to the direction shown by the arrow mark H in FIG. 15 against the bias of the spring 151. When the plate 147 is turned, the lid opening member 142 is turned in the direction shown by the arrow mark I in FIG. 15 which is opposite to the rotating direction of the lid 10, as the pin 148 is guided in the aperture 149, the thrust section 145 turning the lid 10 against the bias of the torsion coil spring 11 to open the front side of the cassette half 4 as shown in FIGS. 10 and 17.

Although the lid opening member 141 is secured to the chassis 36, it may also be turned in operative association with the descent of the cassette holder 35, similarly to the other lid opening member 142.

The tape recorder is provided with a tape cassette discharge unit for projecting the tape cassette 1 out of the cassette holder 35 to the take-out position in the course of the cassette eject operation during which the cassette holder 35 holding the inserted tape cassette 1 therein is shifted from the tape cassette attachment position towards the first position.

Figure 18:
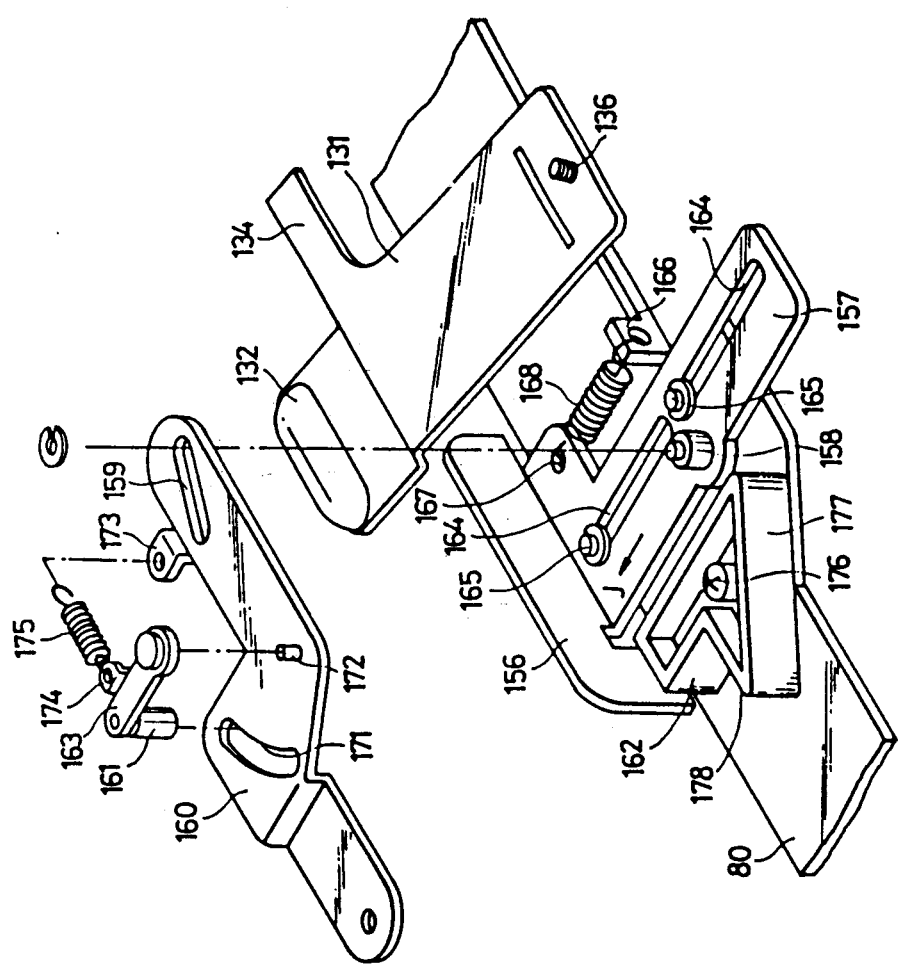
FIG. 18 is an exploded perspective view looking from the bottom surface of the tape cassette ejection unit.

Referring to FIGS. 1, 2 and 18, this tape cassette discharge unit is provided with a cassette thrust lever 157 reciprocatingly supported on the slide guide chassis 40 with the cassette thrust section 156 facing to the midportion on the back side facing to the tape cassette insertion opening 35a on the front side of the cassette holder 35, a rotating lever 160 rotatably supported by the chassis 36 and connected to the cassette thrusting lever 157 with the guide pin 158 on the cassette thrusting lever 157 engaging in the guide groove 159, and a cam lever 163 carrying a cam follower 161 and supported rotatably by the rotating lever 160, with the cam lever 163 being biased to be turned in a direction of abutting the cam follower 161 with a cam member 162 provided to the slide guide frame 40.

In order that the front lid 10 of the tape cassette 1 inserted and held in the cassette holder 35 will be thrusted stably over a wide area, the cassette thrusting lever 157 constituting the tape cassette discharge unit has a wide cassette thrust section 156 at the forward side, so that it has the shape of a letter U as shown in FIGS. 1, 2 and 18. This cassette thrusting lever 157 is reciprocatingly mounted in the reciprocating direction of the slide guide frame 40, with the slide guide pins 165, 165 on the lower side of the connecting support plate 80 of the slide guide frame 40 engaging in the longitudinally extending slide guide slots 164, 164, so that the cassette thrust section 156 faces to the midportion of the cassette holder 35. The cassette thrusting lever 157 is biased to be shifted in a direction away from the cassette holder 35 or in a direction shown by the arrow mark J in FIGS. 1 and 18 by a tension spring 168 retained between a spring retainer 166 on the rear side of the plate 80 of the slide guide frame 40 and the spring retaining opening 167 on the front side of the cassette thrusting lever 157. The cassette thrust section 156 is held at this time at a predetermined distance from the front side of the tape cassette 1 so as not to thrust the tape cassette 1 inserted and held in the cassette holder 35.

The rotating lever 160 is turnably mounted, as shown in FIGS. 1 and 18, with its proximal side pivotally supported by a supporting shaft 170 of a supporting member 169 on the upper rear side of the supporting side plate 76 attached to the chassis 36. This lever 160 is biased by a tension spring 168, biasing the cassette thrusting lever 157, so that the lever is biased to be turned about the supporting shaft 170 as center and in a direction opposite to the direction shown by the arrow mark K in FIG. 1. Thus the rotating lever 160 is connected to the cassette thrusting lever 157, by that the guide pin 158 of the cassette thrusting lever 157 is engaged with the elongated guide slot 159, and is turned about the supporting shaft 170 as center, by that the guide pin 158 is moved within the guide slot 159 with the shifting of the cassette thrusting lever 157.

The cam lever 163 is turnably mounted to the lower surface of the rotating lever 160, with the cam follower 161 engaging in an arcuate guide groove 171 formed in the lever 160 and with its proximal side pivotally supported by a supporting shaft 172 provided to the rotation lever 160. This cam lever 163 is urged to be turned in a direction of abutting the cam follower 161 with the cam member 162 provided to the lower surface of the plate 80 of the slide guide frame 40, or in the direction shown by the arrow mark L in FIG. 1, by a tension spring 175 installed under tension between a spring retainer 173 of the rotating lever 160 and a spring retainer 174 of the cam lever 163.

The cam member 162 abutted and engaged by the cam follower 161 is formed as a molding of synthetic resin, and is mounted via a supporting pin 176 to the lower side of the connecting supporting plate 80 of the slide guide frame 40. The cam member 161 is provided with a first cam surface 177 which, when the slide guide frame 40 is reciprocated to shift the cassette holder 35 from the first position shown in FIG. 1 to the second position shown in FIG. 7, thrusts the cam follower 161, rotates only the cam lever 163 against the bias of the tension spring 175, and releases the abutting engagement in the process of lowering the cassette holder 35 towards the tape cassette attachment position after the slide guide frame 40 has shifted the cassette holder 35 to the second position. This first cam surface 177 is formed as an inclined cam surface inclined a predetermined angle in the reciprocating direction of the slide guide frame 40. The cam member 162 is also provided with a second cam surface 178 which is adapted to bring the cam follower 161 into pressure engagement with the cam member during the time that the cassette holder 35 with the slide guide frame 40 in the state of having been lowered to the side of the tape cassette attachment position is raised to the second position which is at an elevated position relative to the tape cassette attachment position The second cam surface 178 is also adapted to turn the cam lever 163 in the rotational bias direction by the tension spring 175 during the time the cassette holder 35 is shifted from the second position towards the first position to turn the lever 160 towards the cassette holder 35 in the direction shown by the arrow mark K in FIG. 19 through the medium of this cam lever 163. This second cam surface 178 is formed so as to be normal to the reciprocating direction of the slide guide frame 40, and is of such a length as to release the engagement of the cam follower 161 during the time the slide guide frame 40 is returned to shift the cassette holder 35 to the first position after the cam lever 161 is turned a predetermined amount.

In the above described tape cassette discharge mechanism, when the slide guide frame 40 is moved forwards to shift the cassette holder 35 from the first position, to the second position, the first cam surface 177 causes the cam lever 163 to be turned against the bias of the tension spring 175. At this time, the cam lever 163 is turned with the cam follower 161 being guided by the arcuate guide groove 171, the lever 160 is not given the rotational bias and is maintained in the inoperative position, while the cassette thrusting lever 157 is also maintained in the inoperative position. Therefore, in the course of attachment of the tape cassette 1 to the tape cassette attachment position, the tape cassette 1 inserted and held in the cassette holder 35 is not thrusted in the discharge direction.

Figure 19:
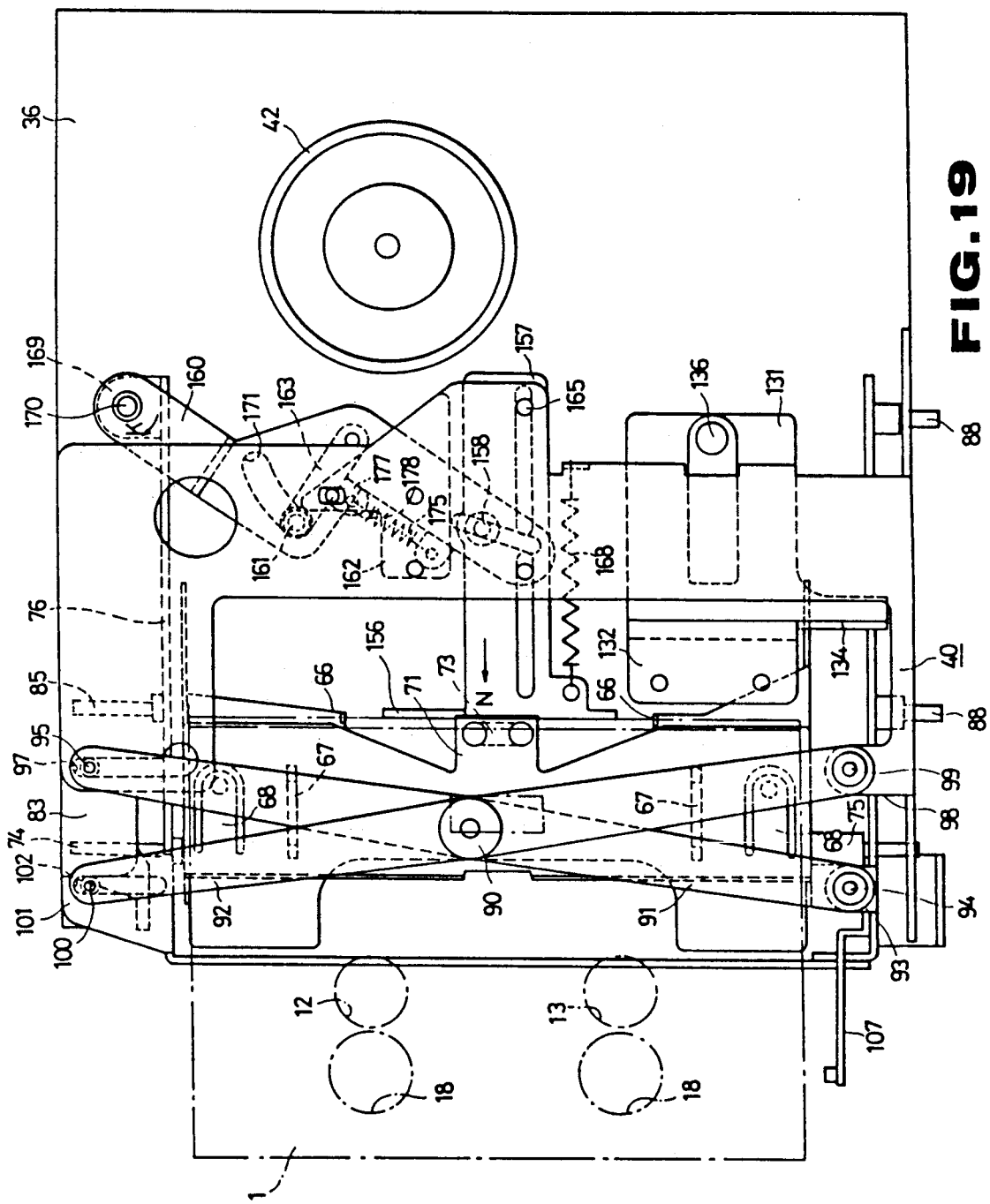
FIG. 19 is a plan view showing the state of ejecting the tape cassette from the cassette holder.

During the time the slide guide frame 40 is returned to shift the cassette from the second position to the first position, the cam lever 163 is turned in the direction of the rotational bias by the tension spring 175, in the direction of an arrow mark L, as shown in FIGS. 7 and 19, so that the cam follower 161 is pressured onto the end in the rotational direction of the arcuate guide slot 171. Also the cam follower 161 is pressured to and engaged with the second cam surface 178, so that, as the slide guide frame 40 is shifted in the return direction, the rotating lever 160 and the cam lever 163 are turned as one towards the cassette holder 35 in the direction of the arrow mark K in FIGS. 1 and 19, with the supporting shaft 170 as center. When the rotating lever 160 is turned in this manner, the cassette thrusting lever, 157 interconnected with the rotating lever 160 with the engaging pin 158 engaging in the guide groove 159 is intruded towards the inside of the cassette holder 35 in the direction of the arrow mark N in FIG. 19 against the bias of the tension spring 168. The cassette thrust section 156 at the foremost part of the cassette thrusting lever 157 thrusts the front lid 10 of the tape cassette 1 inserted and held in the cassette holder 35 and closed by the return spring 11 to project the tape cassette 1 towards the tape cassette insertion/removal opening 35a of the cassette holder 35 to enable the tape cassette to be taken out via the cassette holder 35.

When projected out of the cassette holder 35, the tape cassette 1 provides for relative movement between the cassette half 4 and the closure plate 14 to close the reel drive shaft insertion openings 12, 13.

The state of attachment of the tape cassette 1 to the above described digital audio tape recorder is hereinafter explained.

For attaching the tape cassette 1, the slide guide frame 40 is shifted to the forward end side of the chassis 36, as shown in FIGS. 1 and 6, to shift the cassette holder 35 to a first position to enable the insertion and removal of the tape cassette 1. In this state, the locking member 134 of the sensor plate 131 provided to the slide guide frame 40 is engaged with the locking section 133 formed in the other side plate 77, so that the slide guide frame 40 is locked against movement The cassette holder 35 shifted by the slide guide frame 40 is also maintained in the above described first position.

At this time, the tape cassette 1 is inserted into the cassette holder 35 from the front lid side via the insertion opening of an outer casing, not shown, of the tape recorder The tape cassette 1 inserted into the cassette holder 35 is released from retention by the cassette half 4 of the closure plate 14, with the ribs 67, 67 engaging in the grooves 20, 20 in the closure plate 14, and is thrust and supported by the cassette thrust support members 68, 68 and the bottom plate 60. As the tape cassette 1 is inserted further into the inside of the cassette holder 35, the lugs 15, 15 of the closure plate 14 abut on the projections 66, 66 to restrict the movement of the closure plate 14. As the tape cassette 1 is inserted further into the inside of the cassette holder 35, the cassette half 4 is moved further inward with respect to the closure plate 14 until the insertion openings 18, 18 in the closure plate 14 are in register with the reel drive shaft insertion openings 12, 13 on the bottom surface of the cassette half 4 to open these openings 12, 13. At this time, the engaging projection 72 at the end of the engaging thrust support member 71 engages with the engaging recess 32 on the upper surface of the cassette half 4. The tape cassette 1, which has its both sides thrust and supported by the cassette thrust support members 68, 68 and its central portion thrust and supported by the member 71, is controlled with respect to the inserting and holding position with respect to the cassette holder 35 by the engagement of the projection 72 with the recess 73. In addition, when the cassette half 4 is inserted so that the projection 72 is engaged with the recess 32, the mating thrust section 132 of the sensor member 131 is thrust upwards by the cassette half 4. (!y such thrust of the section 132, the sensor member 131 is turned upwards against the bias of the spring plate 137 to disengage the locking member 134 of the sensor member 131 from the locking section 133 of the side member 77 to enable the shifting of the slide guide frame 40. At this time, the frame 40 is shifted slightly in the forward direction, and the slide member 126 provided to the frame 40, so far thrusting the thrusting member 128a of the return position sensor switch 128, is separated therefrom to release the thrust state of the thrusting member 128a, and the output of starting the drive motor 37 is issued from the return position sensor switch 128. Based on this signal, the driving motor 37 starts to be driven in the forward direction.

At this time, the slide guide frame 40 is moved forwards in the direction shown by the arrow mark B in FIG. 1 The cassette holder 35 supported by this guide frame 40 is shifted as one with the guide frame 40 from the first position to the second position shown in FIGS. 7 and 8 in which the reel drive shaft inserting openings 12, 13 are in register with the reel drive shafts 38, 39. As the driving motor 37 is driven further in the forward direction to shift the guide frame 40 further in the forward direction shown in FIG. 9, the cassette holder 35 is lowered towards the tape cassette attachment position, as the supporting pins 74, 74, 75, 75 are guided within the inclined cam grooves 105, 105, 106, 106 of the slide guide frame 40. The tape cassette 1 inserted and held in the cassette holder 35 is attached at the predetermined tape cassette attachment position with the drive shafts 38, 38 engaging with the tape reels 5, 6, under restrictions of the attachment position by the tape cassette positioning pins 180, 180.

When the frame 40 is moved forwards until the cassette holder 35 is lowered to the tape cassette attachment position, the thrusting member 129a of the sensor switch 129 is thrust to terminate the driving of the motor 37 in the forward direction to complete the attachment of the tape cassette.

As the cassette holder 35 is lowered towards the tape cassette attachment position, the thrust sections 144, 145 of the lid opening sections 141, 142 abut on both sides, on the lower edge of the front lid 10 of the tape cassette 1 to effect the turning of the lid 10 to open the front side of the cassette half 4, the magnetic tape 7 extending on the front side being exposed to outside to enable the extraction thereof by the loading system.

During attachment of the tape cassette 1, the tape attachment sensor switches 33, 33 are thrust by the tape cassette 1 to detect the attachment of the tape cassette 1 to start the driving of the loading motor 52.

As the front lid 10 is opened and tape cassette 1 is attached at the tape cassette attachment position, the shift guide blocks 43, 44 of the loading unit start to be shifted from the tape cassette attachment position towards the magnetic head device 42. The loading operation is then performed for taking up the magnetic tape 7 abut the tape guide drum of the magnetic head device 42 and extracting the tape to cause it to run along a predetermined route. After termination of the loading operation, the tape recorder is ready for recording and-/or reproducing predetermined information signals.

The state of removing the tape cassette 1 attached to the predetermined tape cassette attachment position from the tape recorder is hereinafter explained.

For taking out the tape cassette 1, the eject button provided to the main body of the apparatus is actuated. The loading unit is actuated in this manner to retract the tape 7 extracted onto the predetermined tape route into the cassette half 4. After such retraction of the magnetic tape 7, the driving motor 37 is driven in reverse. The guide frame 40 starts to be moved in the return direction to elevate the cassette holder 35 previously lowered towards the tape cassette attachment position towards the second position shown in FIG. 8. During this elevation of the cassette holder 35, the front lid 10 of the tape cassette 1 is turned in the return direction by the coil spring 11 to close the front side of the cassette half 4.

As the slide guide frame 40 is shifted further in the return direction after the cassette holder 35 is raised to the second position, the cam lever 163 engaging the cam follower 161 with the second cam surface 178 of the cam member 162 is turned in the bias direction of the tension spring 175 to turn the rotating lever 160 towards the cassette holder 35 in the direction shown by the arrow mark K in FIG. 19. By such turning of the rotating lever 160, the cassette thrusting lever 157 is thrust towards the inside of the cassette holder 35 in the direction shown by the arrow mark N in FIG. 19, against the bias of the tension spring 168, for thrusting the tape cassette 1 inserted and held in the cassette holder 35 by the cassette thrust section 156. When the tape cassette 1 is thrusted in this manner, the cassette half 4 is shifted towards the tape cassette insertion/removal opening 35a of the cassette holder 35, while disengaging the end projection 72 of the thrusting and supporting member 71 from the engaging recess 32. The cassette half 4 performs a relative movement with respect to the closure plate 14 to reach the initial state of closing the reel drive shaft insertion openings 12, 13. The tape cassette is further thrust by the cassette thrust section 156 and projected via the tape cassette insertion/removal opening 35a so that it is projected at least in part out of the outer casing via the tape cassette insertion opening formed in the outer casing to enable the tape cassette to be taken out of the cassette holder 35.

As the slide guide frame 40 is returned for shifting the cassette holder 35 to the first position shown in FIGS. 1 and 6, the switch operating member 126 thrusts the thrusting member 128a of the sensor switch 128, as shown in FIG. 5 to sense that the slide guide frame 40 has reached the return position to discontinue the driving of the motor 37 in reverse to terminate the removal of the tape cassette 1.

As the frame 40 is moved further in the return direction after the cassette thrusting lever 157 has shifted the tape cassette 1 in an amount sufficient to project the tape cassette 1 out of the cassette holder 35, the cam follower 161 is disengaged from its abutment with the second cam follower 178. With the cam follower 161 thus disengaged, the cassette thrusting lever 157 is returned to its initial position retracted with respect to the cam holder 35 under the bias of the tension spring 168, as shown in FIG. 1.

From the foregoing it is seen that the present invention provides an arrangement in which, when the tape cassette is inserted into the cassette holder with the reel drive shaft insertion openings in the bottom of the cassette half being opened, the tape cassette insertion sensor member locking the slide guide frame shifting the cassette holder by the tape cassette is lifted against the bias of the bias means to release the locking of the slide guide frame to enable the shifting of the slide guide frame to effect the shifting of the cassette holder and the attachment of the tape cassette. In this manner, safe and reliable tape cassette attachment may be realized, while the protection of the mechanical portions of the magnetic recording/reproducing apparatus and the tape cassette as well as the sensing of the insertion of the tape cassette into the cassette holder may be achieved by a simplified system.

Above all, since the tape cassette insertion sensor member is actuated by the tape cassette when the cassette half is moved relative to the closure plate to open the reel drive shaft insertion openings, the relative movement between the cassette half and the closure plate and hence, tape cassette thrusting are not performed when, for example, the tape cassette is inadvertently inserted from the rear side, to prevent the mistaken insertion of the tape cassette.

What is claimed is:

1. A tape cassette attachment device comprising a cassette holder into which a tape cassette rotatably accommodating a pair of tape reels carrying a magnetic tape wound thereon, a slide guide frame supporting said cassette holder for vertical movement and supported for horizontal movement with respect to a chassis of a main body, said slide guide frame being reciprocating between a first position in which said tape cassette is enabled to be inserted into or detached from said cassette holder and a second position in which the tape reels of said tape cassette are in register with reel drive shafts of said chassis, and vertically shifting said cassette holder at said second position, locking and holding means for locking and holding said slide guide frame at said first position with respect to said chassis for inhibiting the shifting of said slide guide frame, and means for sensing the tape insertion, said means sensing that said tape cassette has been inserted to a prescribed position in said cassette holder and releasing locking of said locking and holding means wherein a closure plate movable between a closed position of closing a pair of reel drive shaft insertion openings formed at least on the bottom surface of the cassette half and an open position of opening said reel drive shaft insertion openings is mounted to the outer bottom surface of the cassette half and a turnable lid is provided for opening or closing an aperture on the front side of the cassette half;

wherein the cassette holder includes control projection means on the bottom plate thereof, said control projection means controlling the movement of said closure plate in opposition to the inserting operation of said tape cassette and shifting said closure plate from said closure position to said opening position on the occasion of the shifting of said cassette half; and wherein said tape cassette insertion sensor means is at a position of being thrust and controlled by the cassette half only when the tape cassette is introduced into said cassette holder and said closure plate is shifted completely to said opening position by said control projection means, said sensor means being at a position of being not thrust and controlled by said cassette half when said closure plate is not shifted completely to said opening position.

2. The tape cassette attachment device according to claim 1 wherein said tape cassette insertion sensor means includes a tape cassette insertion sensor member rotatably or movably mounted to said slide guide frame, said sensor member including a mating thrust section thrust and controlled by said cassette half and a locking member engaging with a locking section provided to the support side plate provided on the main chassis movably supporting the slide guide frame.

3. The tape attachment device according to claim 1 wherein said cassette holder includes engaging thrust support means on the upper surface thereof, said engagement thrust support means engaging in a rectangular engagement recess for positioning responsive to the insertion of said tape cassette, said engagement recess being formed on the upper surface of said cassette half at the center in the left and right direction towards said opening/closure lid, said tape cassette insertion sensor means being at a position of being thrust and controlled by said cassette half only when said tape cassette is inserted into said cassette holder and said engagement recess is completely engaged by said engagement thrust support means and at a position of not being thrust and controlled by said cassette half when said engaging recess is not completely engaged.

* * * * *